United States Patent
Li et al.

(10) Patent No.: US 12,131,580 B2
(45) Date of Patent: Oct. 29, 2024

(54) FACE DETECTION METHOD, APPARATUS, AND DEVICE, AND TRAINING METHOD, APPARATUS, AND DEVICE FOR IMAGE DETECTION NEURAL NETWORK

(71) Applicant: TENCENT TECHNOLOGY (SHENZHEN) COMPANY LIMITED, Shenzhen (CN)

(72) Inventors: Jian Li, Shenzhen (CN); Bin Zhang, Shenzhen (CN); Yabiao Wang, Shenzhen (CN); Jinlong Peng, Shenzhen (CN); Chengjie Wang, Shenzhen (CN); Jilin Li, Shenzhen (CN); Feiyue Huang, Shenzhen (CN); Yongjian Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 361 days.

(21) Appl. No.: 17/733,968

(22) Filed: Apr. 29, 2022

(65) Prior Publication Data
US 2022/0262162 A1 Aug. 18, 2022

Related U.S. Application Data

(63) Continuation of application No. PCT/CN2021/086106, filed on Apr. 9, 2021.

(30) Foreign Application Priority Data

May 9, 2020 (CN) .......................... 202010385628.3

(51) Int. Cl.
*G06N 3/08* (2023.01)
*G06V 10/80* (2022.01)
*G06V 40/16* (2022.01)

(52) U.S. Cl.
CPC ............. *G06V 40/164* (2022.01); *G06N 3/08* (2013.01); *G06V 10/806* (2022.01); *G06V 40/168* (2022.01)

(58) Field of Classification Search
CPC .. G06V 40/164; G06V 10/806; G06V 40/168; G06V 40/161; G06N 3/08; G06N 3/045; G06F 18/214
(Continued)

(56) References Cited

U.S. PATENT DOCUMENTS

2002/0081003 A1   6/2002   Sobol
2018/0204051 A1*  7/2018   Li ....................... G06V 10/764

FOREIGN PATENT DOCUMENTS

CN   107392901 A   11/2017
CN   109657551 A    4/2019
(Continued)

OTHER PUBLICATIONS

Y. Abramson et al., "YEF Real-Time Object Detection," in International Journal of Intelligent Systems Technologies and Applications, Jan. 2007. 6 pages.
(Continued)

*Primary Examiner* — Stephen P Coleman
(74) *Attorney, Agent, or Firm* — ANOVA LAW GROUP, PLLC

(57) ABSTRACT

A face detection method includes: acquiring a target image; invoking a face detection network, and processing the target image by using a feature extraction structure of the face detection network, to obtain original feature maps corresponding to the target image; the original feature maps having different resolutions; processing the original feature maps by using a feature enhancement structure of the face detection network, to obtain an enhanced feature map corresponding to each original feature map; the feature
(Continued)

enhancement structure being obtained by searching a search space, and the search space used for searching the feature enhancement structure being determined based on a detection objective of the face detection network and a processing object of the feature enhancement structure; and processing the enhanced feature map by using a detection structure of the face detection network, to obtain a face detection result of the target image.

20 Claims, 11 Drawing Sheets

(58) Field of Classification Search
USPC .......................................................... 382/118
See application file for complete search history.

(56) References Cited

FOREIGN PATENT DOCUMENTS

| | | |
|---|---|---|
| CN | 109670452 A | 4/2019 |
| CN | 110084124 A | 8/2019 |
| CN | 110378278 A | 10/2019 |
| CN | 110647817 A | 1/2020 |
| CN | 110866140 A | 3/2020 |
| CN | 111291739 A | 6/2020 |

OTHER PUBLICATIONS

Y. Chen et al., "DetNAS: Backbone search for object detection," arXiv:1903.10979v4, Dec. 30, 2019. 12 pages.
C. Chi et al., "Selective refinement network for high performance face detection," In Thirty-Third AAAI Conference on Artificial Intelligence (AAAI-19), pp. 8231-8238, 2019. 8 pages.
J. Deng et al., "ArcFace: Additive angular margin loss for deep face recognition," arXiv:1801.07698v3, Feb. 9, 2019. 11 pages.
J. Deng et al., "RetinaFace: Single-stage dense face localisation in the wild," arXiv preprint arXiv:1905.00641v2, May 4, 2019. 10 pages.
X. Dong et al., "Searching for a robust neural architecture in four gpu hours," arXiv:1910.04465v2, Oct. 16, 2019. 10 pages.
G. Ghiasi et al., "NAS-FPN: Learning scalable feature pyramid architecture for object detection," In: CVPR, 2019, pp. 7036-7045. 10 pages.
R. Girshick, "Fast R-CNN," arXiv:1504.08083v2, Sep. 27, 2015. 9 pages.
K. He et al., "Deep residual learning for image recognition," In: CVPR, 2016, pp. 770-778. 9 pages.
A.G. Howard et al., "MobileNets: Efficient convolutional neural networks for mobile vision applications," arXiv preprint arXiv:1704.04861v1, Apr. 17, 2017. 9 pages.
Y. Huang et al., "CurricularFace: Adaptive curriculum learning loss for deep face recognition," arXiv:2004.00288v1, Apr. 1, 2020. 10 pages.
V. Jain et al., "FDDB: A benchmark for face detection in unconstrained settings," Tech. rep., UMass Amherst technical report, 2010. 11 pages.
E. Jang et al., "Categorical reparameterization with gumbel-softmax," arXiv preprint arXiv:1611.01144v5, Aug. 5, 2017. 13 pages.
K. Levi et al., "Learning object detection from a small number of examples: the importance of good features," In: CVPR, 2004. 8 pages.
H. Li et al., "A convolutional neural network cascade for face detection," In: CVPR, pp. 5325-5334, 2015. 10 pages.
J. Li et al., "Object detection via feature fusion based single network," In: ICIP, pp. 3390-3394, IEEE, 2017. 5 pages.
J. Li et al., "DSFD: Dual shot face detector," In: CVPR, pp. 5060-5069, 2019. 10 pages.
T.-Y. Lin et al., "Feature pyramid networks for object detection," arXiv:1612.03144v2, Apr. 19, 2017. 10 pages.
T.Y. Lin et al., "Focal loss for dense object detection," arXiv:1708.02002v2, Feb. 7, 2018. 10 pages.
H. Liu et al., "DARTS: Differentiable architecture search," arXiv preprint arXiv:1806.09055v2, Apr. 23, 2019. 13 pages.
S. Liu et al., "Path aggregation network for instance segmentation," arXiv:1803.01534v4, Sep. 18, 2018. 11 pages.
S. Liu et al., "Receptive field block net for accurate and fast object detection," arXiv:1711.07767v3, Jul. 26, 2018. 16 pages.
W. Liu et al., "SSD: Single shot multibox detecto," arXiv:1512.02325v5, Dec. 29, 2016. 17 pages.
C.J. Maddison et al., "The concrete distribution: A continuous relaxation of discrete random variables," arXiv preprint arXiv:1611.00712v3, Mar. 5, 2017. 20 pages.
H. Pan et al., "Mean-variance loss for deep age estimation from a face," In: CVPR, pp. 5285-5294, 2018. 10 pages.
S. Ren et al., "Faster R-CNN: Towards real-time object detection with region proposal networks," arXiv:1506.01497v3, Jan. 6, 2016. 14 pages.
H. Rezatofighi et al., "Generalized intersection over union: A metric and a loss for bounding box regression," arXiv:1902.19630v2, Apr. 15, 2019. 9 pages.
P. Sermanet et al., "Overfeat: Integrated recognition, localization and detection using convolutional networks," arXiv preprint arXiv:1312.6229v4, Feb. 24, 2014. 16 pages.
C. Szegedy et al., "Inception-v4, inception-resnet and the impact of residual connections on learning," arXiv:1602.07261v2, Aug. 23, 2016. 12 pages.
C. Szegedy et al., "Rethinking the inception architecture for computer vision," arXiv:1512.00567v3, Dec. 11, 2015. 10 pages.
Y. Tai et al., "Towards Highly Accurate and Stable Face Alignment for High-Resolution Videos," In Thirty-Third AAAI Conference on Artificial Intelligence (AAAI-19), pp. 8893-8900, 2019. 8 pages.
M. Tan et al., "EfficientNet: Rethinking model scaling for convolutional neural networks," arXiv preprint arXiv:1905.11946v5, Sep. 11, 2020. 11 pages.
M. Tan et al., "EfficientDet: Scalable and efficient object detection," arXiv preprint arXiv:1911.09070v7, Jul. 27, 2020. 10 pages.
X. Tang et al., "Pyramidbox: A context-assisted single shot face detector," arXiv:1803.07737v2, Aug. 17, 2018. 21 pages.
P. Viola et al., "Robust real-time face detection," International journal of computer vision 57(2), pp. 137-154, 2004. 18 pages.
H. Wang et al., "Face R-CNN," arXiv preprint arXiv:1706.01061v1, Jun. 4, 2017. 10 pages.
H. Wang et al., "Cosface: Large margin cosine loss for deep face recognition," arXiv:1801.09414v2, Apr. 3, 2018. 11 pages.
N. Wang et al., "NAS-FCOS: Fast neural architecture search for object detection, " arXiv preprint arXiv:1906.04423v4, Feb. 25, 2020. 9 pages.
Y. Wang et al., "Detecting faces using region-based fully convolutional networks," arXiv preprint arXiv:1709.05256v2, Sep. 18, 2017. 10 pages.
Y. Wen et al., "A discriminative feature learning approach for deep face recognition," In: ECCV, pp. 499-515, Springer, 2016. 17 pages.
S. Wu et al., "IoU-balanced loss functions for single-stage object detection," arXiv preprint arXiv:1908.05641v2, Dec. 14, 2020. 22 pages.
H. Xu et al., "Auto-FPN: Automatic network architecture adaptation for object detection beyond classification," In: ICCV, pp. 6649-6658, 2019. 10 pages.
Y. Xu et al., "PC-DARTS: Partial channel connections for memory-efficient differentiable architecture search," arXiv preprint arXiv:1907.05737v4, Apr. 7, 2020. 13 pages.
J. Yang et al., "Nuclear norm based matrix regression with applications to face recognition with occlusion and illumination changes," IEEE transactions on pattern analysis and machine intelligence 39(1), 2016. 32 pages.
S. Yang et al., "WIDER Face: A face detection benchmark," arXiv:1511.06523v1, Nov. 20, 2015. 12 pages.
Y. Yoo et al., "EXTD: Extremely tiny face detector via iterative filter reuse," arXiv preprint arXiv:1906.06579v2, Jun. 23, 2019. 11 pages.

(56) References Cited

OTHER PUBLICATIONS

C. Zhang et al., "Face Detection Using Improved Faster RCNN," arXiv preprint arXiv:1802.02142v1, 2018. 9 pages.
F. Zhang et al., "Joint pose and expression modeling for facial expression recognition," In: CVPR, pp. 3359-3368, 2018. 10 pages.
K, Zhang et al., "Joint face detection and alignment using multitask cascaded convolutional networks," IEEE Signal Processing Letters 23(10), pp. 1499-1503, 2016. 5 pages.
S. Zhang et al., "Refineface: Refinement neural network for high performance face detection," arXiv preprint arXiv:1909.04376v1, Sep. 10, 2019. 12 pages.
The State Intellectual Property Office of the People's Republic of China (SIPO) Office Action 1 for for 202010385628.3 Jun. 29, 2020 15 Pages (including translation).
The World Intellectual Property Organization (WIPO) International Search Report for PCT/CN2021/086106 Jul. 19, 2021 7 Pages (including translation).
S. Zhang et al., "Single-shot refinement neural network for object detection," arXiv:1711.06897v3, Jan. 3, 2018. 14 pages.
S. Zhang et al., "Faceboxes: A CPU real-time face detector with high accuracy," arXiv:1708.05234v4, Dec. 25, 2018. 9 pages.
Z. Zheng et al., "Distance-IoU loss: Faster and better learning for bounding box regression," arXiv preprint arXiv:1911.08287v1, Nov. 19, 2019. 8 pages.
B. Zoph et al., "Learning transferable architectures for scalable image recognition," arXiv:1707.07012v4, Apr. 11, 2018. 14 pages.

\* cited by examiner

FACE DETECTION METHOD, APPARATUS, AND DEVICE, AND TRAINING METHOD, APPARATUS, AND DEVICE FOR IMAGE DETECTION NEURAL NETWORK

CROSS-REFERENCES TO RELATED APPLICATIONS

This application is a continuation application of PCT Patent Application No. PCT/CN2021/086106, entitled "METHODS AND APPARATUSES FOR TRAINING FACE DETECTION AND IMAGE DETECTION NEURAL NETWORKS, AND DEVICE" and filed on Apr. 9, 2021, which claims priority to Chinese Patent Application No. 202010385628.3, entitled "FACE DETECTION METHOD, APPARATUS, AND DEVICE, AND TRAINING METHOD, APPARATUS, AND DEVICE FOR IMAGE DETECTION NEURAL NETWORK" and filed with the China National Intellectual Property Administration on May 9, 2020, the entire contents of both of which are incorporated herein by reference.

FIELD OF THE TECHNOLOGY

The present disclosure relates to the field of computer technologies, and in particular, to a face detection method, apparatus, and device, and a training method, apparatus, and device for an image detection neural network.

BACKGROUND OF THE DISCLOSURE

With the rise and development of artificial intelligence, training of a neural network and data processing by using the trained neural network are increasingly widespread. For example, a face detection network is trained, and face detection is performed on an image by using the trained face detection network.

Currently, when the face detection network is being trained, an image including the face may be obtained for training, so that the face detection network learns of a model parameter for identifying the image including the face. However, there is often a case in which it is difficult for the model to perform face detection on some images, which results in low detection accuracy of the face detection network.

SUMMARY

One aspect of the present disclosure provides a face detection method. The method includes: acquiring a target image; invoking a face detection network, and processing the target image by using a feature extraction structure of the face detection network, to obtain original feature maps corresponding to the target image; the original feature maps having different resolutions; processing the original feature maps by using a feature enhancement structure of the face detection network, to obtain an enhanced feature map corresponding to each original feature map; the feature enhancement structure being obtained by searching a search space, and the search space used for searching the feature enhancement structure being determined based on a detection objective of the face detection network and a processing object of the feature enhancement structure; and processing the enhanced feature map by using a detection structure of the face detection network, to obtain a face detection result of the target image.

Another aspect of the present disclosure provides a face detection apparatus. The apparatus includes: an acquiring module, configured to acquire a target image; an extraction module, configured to invoke a face detection network, and process the target image by using a feature extraction structure of the face detection network, to obtain original feature maps corresponding to the target image; the original feature maps having different resolutions; an enhancement module, configured to process the original feature maps by using a feature enhancement structure of the face detection network, to obtain an enhanced feature map corresponding to each original feature map; the feature enhancement structure being obtained by searching a search space, and the search space used for searching the feature enhancement structure being determined based on a detection objective of the face detection network and a processing object of the feature enhancement structure; and a detection module, configured to process the enhanced feature map by using a detection structure of the face detection network, to obtain a face detection result of the target image.

Another aspect of the present disclosure provides a computer device that includes a memory and one or more processors, where the memory stores computer readable instructions, when executed by the one or more processors, causing the one or more processors to perform the steps of the foregoing face detection method.

Another aspect of the present disclosure provides one or more non-transitory computer readable storage media that store computer readable instructions, when executed by one or more processors, causing the one or more processors to perform the steps of the foregoing face detection method.

Another aspect of the present disclosure provides training method for an image detection neural network. The method includes: acquiring a training image and a face detection network; the face detection network including a feature extraction structure, a feature enhancement structure, and a detection structure; and the feature enhancement structure being obtained by searching a search space, and the search space used for searching the feature enhancement structure being determined based on a detection objective of the face detection network and a processing object of the feature enhancement structure; inputting the training image into the face detection network, and extracting original feature maps of the training image by using the feature extraction structure; the original feature maps having different resolutions; directly inputting the original feature maps into the detection structure to obtain a first detection result; processing the original feature maps by using the feature enhancement structure, to obtain an enhanced feature map corresponding to each original feature map, and inputting the enhanced feature map into the detection structure to obtain a second detection result; and constructing, according to the first detection result, the second detection result, and a training label, a training loss function to train the face detection network, until a training stop condition is met; when the face detection network is used for processing a target image, an output of a branch in which the feature enhancement structure is processed being an output of the face detection network.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodi

DESCRIPTION OF EMBODIMENTS

Figure 1:
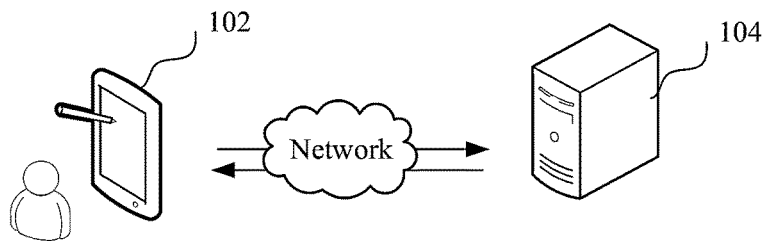
- FIG. 1 is an application environment diagram of a face detection method according to an embodiment.

To make objectives, technical solutions, and advantages of the present disclosure clearer and more comprehensible, the present disclosure is further described in detail with reference to the accompanying drawings and embodiments. It is to be understood that the specific embodiments described herein are only used for explaining the present disclosure, and are not used for limiting the present disclosure.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The AI technology is a comprehensive discipline, covering a wide range of fields including both hardware-level technologies and software-level technologies. The basic AI technology generally includes technologies such as sensors, dedicated AI chips, cloud computing, distributed storage, big data processing technologies, operating/interaction systems, and mechatronics. AI software technologies mainly include a computer vision technology, a speech processing technology, a natural language processing technology, machine learning/deep learning, and the like.

The computer vision (CV) technology is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Machine Learning (ML) is a multi-field interdiscipline, and relates to a plurality of disciplines such as the probability theory, statistics, the approximation theory, convex analysis, and the algorithm complexity theory. The machine learning specializes in studying how a computer simulates or implements a human learning behavior to obtain new knowledge or skills, and reorganize an existing knowledge structure, so as to keep improving performance of the computer. The machine learning, as the core of AI, is a basic way to make the computer intelligent, and is applicable to various fields of AI. The machine learning and deep learning generally include technologies such as an artificial neural network, a belief network, reinforcement learning, transfer learning, inductive learning, and learning from demonstrations.

With the research and progress of the AI technology, the AI technology is studied and applied in a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of the present disclosure involve technologies such as CV and ML of AI, and are specifically described by using the following embodiments.

A face detection method provided in the present disclosure may be applied to an application environment shown in FIG. 1. A terminal 102 communicates with a server 104 through a network. The terminal 102 may upload a target image to the server 104. After acquiring the target image, the server 104 invokes a face detection network to process the target image to obtain original feature maps extracted by a feature extraction structure in the face detection network, where the original feature maps are more than one and have different resolutions; and continues to process the original feature maps by using a feature enhancement structure of the face detection network, to obtain an enhanced feature map corresponding to each original feature map, and then processes the enhanced feature map by using a detection structure of the face detection network, to obtain a face detection result of the target image. The target image is processed by using the feature extraction structure of the face detection network, to obtain the original feature maps corresponding to the target image. In some embodiments, the terminal 102 or the server 104 may be separately configured to execute the face detection method.

In the foregoing face detection method, after the target image is acquired, the face detection network is automatically invoked to process the target image. The feature extraction structure in the face detection network extracts the original feature maps from the target image. The feature enhancement structure of the face detection network processes the original feature maps to obtain the enhanced feature maps. The detection structure of the face detection network then obtains the face detection result of the target image based on the enhanced feature maps. There is more than one original feature map with different resolutions. In this way, original feature maps of multiple scales can include more abundant image information, which helps improve accuracy of subsequent face detection. In addition, the enhanced feature map obtained by processing the original feature map enhances feature differentiation and robustness, and further improves face detection accuracy. In addition, the feature enhancement structure is obtained by means of automatic searching, and a search space on which the search is based is determined together according to a detection objective of the face detection network and a processing object of the feature enhancement structure. On the one hand, great workload caused by an artificial design network structure is avoided, and performance is better than that of a manually designed network structure. On the other hand, the feature enhancement structure can be well applied to the face detection network, so that the face detection network can better perform face detection. In this way, detection accuracy is improved and labor costs are reduced.

A training method for an image detection neural network provided in the present disclosure may be applied to the application environment shown in FIG. 1. The terminal 102 communicates with the server 104 through the network. The server 104 may obtain a training image from the terminal 102 to train a face detection network. The server 104 acquires the training image and the face detection network; the face detection network including a feature extraction structure, a feature enhancement structure, and a detection structure; and determines, based on a detection objective of the face detection network and a processing object of the feature enhancement structure, a search space used for searching for the feature enhancement structure; the feature enhancement structure being obtained by searching the search space; inputs the training image into the face detection network, and extracts original feature maps of the training image by using the feature extraction structure; the original feature maps having different resolutions; directly inputs the original feature maps into the detection structure to obtain a first detection result; processes the original feature maps by using the feature enhancement structure, to obtain an enhanced feature map corresponding to each original feature map, and inputs the enhanced feature map into the detection structure to obtain a second detection result; and constructs, according to the first detection result, the second detection result, and a training label, a training loss function to train the face detection network, until a training stop condition is met; when the face detection network is used for processing a target image, an output of a branch in which the feature enhancement structure is processed being an output of the face detection network. In some embodiments, the terminal 102 or the server 104 may be separately configured to perform the training method for an image detection neural network.

In the foregoing training method for an image detection neural network, the face detection network is a dual-branch structure, branching is performed after the feature extraction structure, the feature extraction structure is directly connected to the detection structure as a first branch, and the feature extraction structure is processed by using the feature enhancement model before being connected to the detection structure as a second branch. During training of the face detection network, the two branches cooperate in training, so as to assist in training the second branch by using the first branch, thereby improving training efficiency and effect. When the face detection network is used, the first branch is ignored and an output of only the second branch is used, and a network calculation amount is not increased. In addition, there is more than one original feature map with different resolutions. In this way, original feature maps of multiple scales can include more abundant image information, which helps improve accuracy of subsequent face detection. The enhanced feature map obtained by processing the original feature map enhances feature discrimination and robustness, and further improves face detection accuracy. In addition, the feature enhancement structure is obtained by means of automatic searching, and a search space on which the search is based is determined together according to a detection objective of the face detection network and a processing object of the feature enhancement structure. On the one hand, great workload caused by an artificial design network structure is avoided, and performance is better than that of a manually designed network structure. On the other hand, the feature enhancement structure can be well applied to the face detection network, so that the face detection network can better perform face detection. In this way, detection accuracy is improved and labor costs are reduced.

The terminal 102 may be, but not limited to, a personal computer, a notebook computer, a smartphone, a tablet computer, and a portable wearable device. The server 104 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal and the server may be directly or indirectly connected in a wired or wireless communication manner. This is not limited in the present disclosure.

In an embodiment, the training method for an image detection neural network may also be applied to the application environment shown in FIG. 1. The terminal 102 or the server 104 may be separately configured to perform the training method for an image detection neural network.

Figure 2:
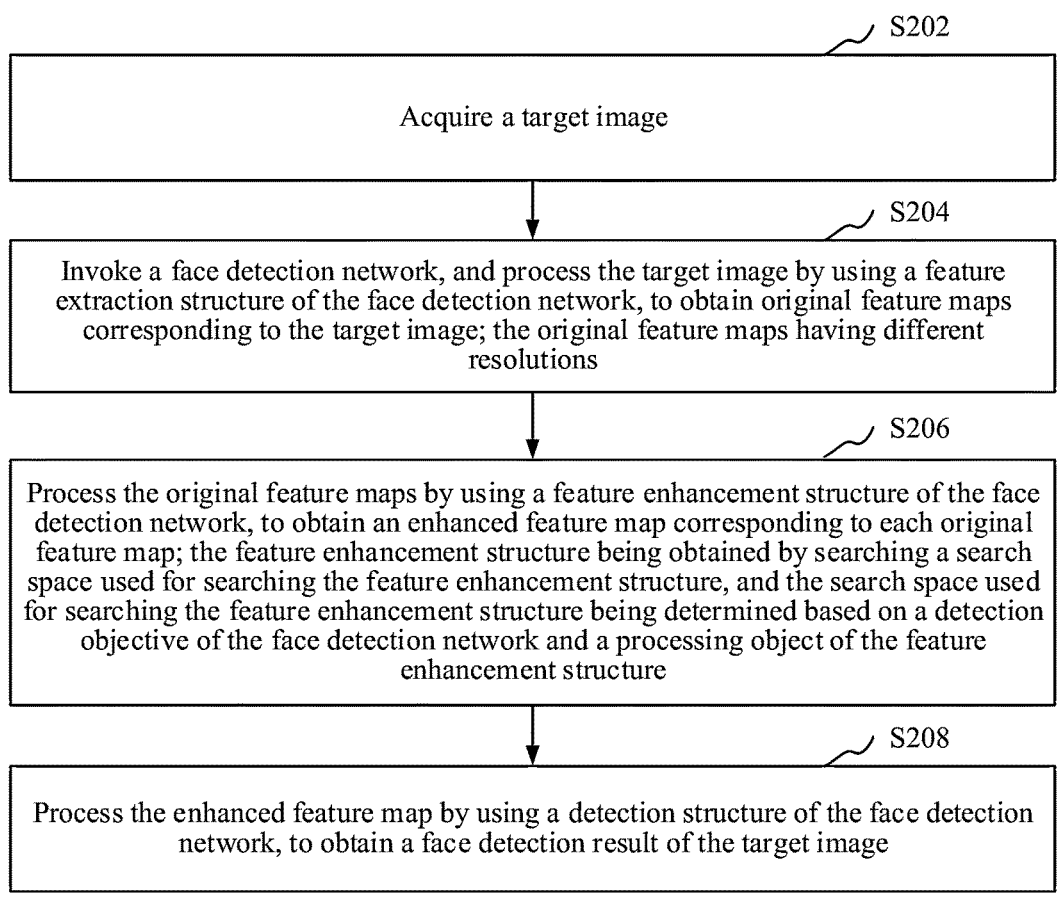
FIG. 2 is a schematic flowchart of a face detection method according to an embodiment.

In an embodiment, as shown in FIG. 2, a face detection method is provided, and the method is applied to the server 104 in FIG. 1 as an example for description. The method includes the following steps:

Step 202: Obtain a target image.

The target image is an image on which face detection is to be performed by using the face detection network provided in the present disclosure. The to-be-processed image may include one or more face regions, or may not include a face region. By performing face detection on the target image according to the face detection network provided in the present disclosure, it can be detected whether the target image includes a face region and a specific location of the included face region in the image.

Specifically, the terminal may collect an image by using a built-in or externally connected image collection apparatus, and upload the collected image as a target image to the server. The terminal may also acquire an image from the Internet, and upload the acquired image as a target image to the server. The terminal may further receive an image transmitted by another computer device, and upload the received image as a target image to the server. In this way, the server acquires the target image. Certainly, in another embodiment, after acquiring the image uploaded by the terminal, the server may use the image as a target image.

Step 204: Invoke a face detection network, and process the target image by using a feature extraction structure of the face detection network, to obtain original feature maps corresponding to the target image; the original feature maps having different resolutions.

The face detection network is a machine learning algorithm model that has a face detection capability after training. The face detection network may be specifically implemented by using a neural network model.

The face may be a face of a natural person, a face of an animal, a face of a virtual role, or the like. In many scenarios, face detection may be used, for example, face detection is performed on a user during identity authentication, or face detection is performed on a virtual character in a cartoon when browsing, or face detection is performed on a person in a picture when photographing.

The face detection network may be structured by function. The feature extraction structure is a local network structure that is in the face detection network and that is used for extracting an image feature from an image.

The original feature map is a feature map outputted by a network layer included in the feature extraction structure. Because further processing is performed on the feature map, in this case, the feature map outputted by the feature extraction structure is referred to as the original feature map, so as to be different from a feature map obtained by further processing.

Generally, after an image is inputted into a neural network, an operation operator at a network layer of the neural network performs an operation on an input to obtain a feature map as an operation result. Each network layer receives an operation result outputted by a network layer of a previous layer, and outputs an operation result of the current layer to a next layer after an operation of the current layer.

Specifically, the server may train the face detection network according to a sample in advance, and directly invoke the trained face detection network when face detection needs to be performed. The feature extraction structure may include more than one network layer, and each network layer outputs one feature map. Then, the server may acquire feature maps separately outputted at the more than one network layer in the feature extraction structure, so as to obtain more than one original feature map. Certainly, the feature extraction structure may also output more than one feature map by using the last network layer. In this way, the server may acquire the feature maps outputted by the last network layer of the feature extraction structure, so as to obtain more than one original feature map.

In an embodiment, the face detection network may use a network structure prior to a classification layer in a classification network commonly used in the machine learning field, such as ResNet or VGG16. Certainly, the face detection network may be customized.

In an embodiment, the invoking a face detection network, and processing the target image by using a feature extraction structure of the face detection network, to obtain original feature maps corresponding to the target image includes: inputting the target image into the face detection network; and acquiring feature maps separately outputted by more than one network layer in the feature extraction structure of the face detection network, to obtain more than one original feature map corresponding to the target image.

Specifically, the server may input the target image into the face detection network, and each network layer of the feature extraction structure outputs one feature map. The server may acquire the feature map outputted by each network layer, to obtain more than one original feature map corresponding to the target image. The server may also select, according to a requirement, feature maps outputted by some network layers in the feature extraction structure to obtain more than one original feature map corresponding to the target image.

Figure 3:
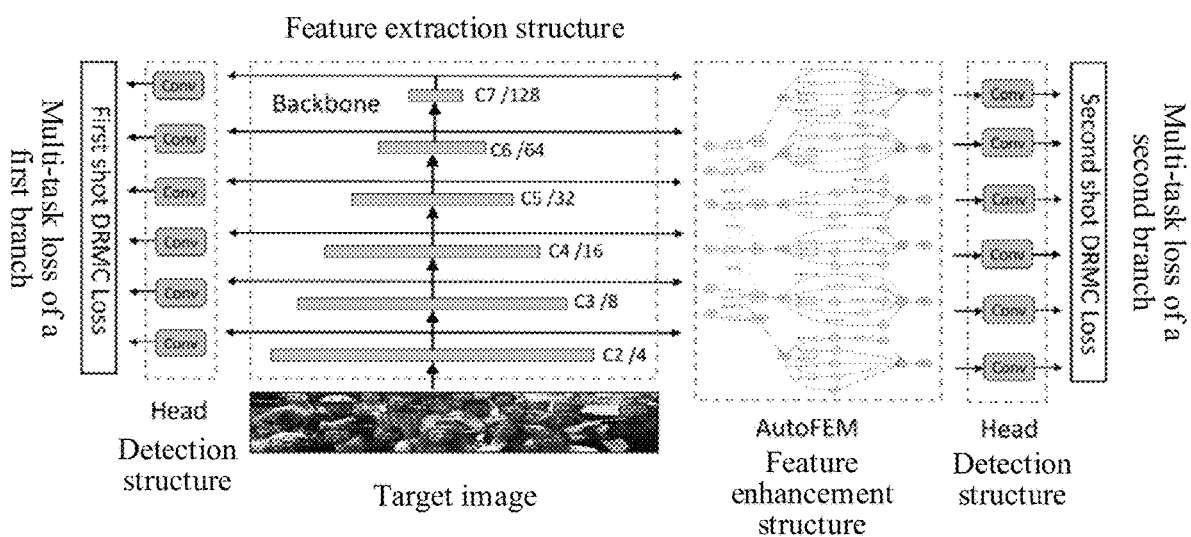
FIG. 3 is a schematic structural diagram of a face detection network according to an embodiment.

For example, FIG. 3 is a schematic structural diagram of a face detection network according to an embodiment. In this embodiment, a feature extraction structure (also referred to as a backbone network) is implemented by using a classification network. Referring to FIG. 3, it may be learned that the backbone network includes six network layers. After a target image is inputted into the face detection network, each network layer of the backbone network outputs one feature map, and six feature maps of different scales (that is, different resolutions) are included in total. "Cn/m" (for example, C2/4, C3/8, and C4/16) represents a feature map outputted by an $n^{th}$ network layer, and a resolution of the feature map is 1/m times of that of an input image (that is, the target image). For example, when the backbone network is ResNet, and "Cn/m" is specifically "C2/4", it represents a feature map outputted by the second stage of ResNet, and a resolution is ¼ (Stride=4) of the input image (that is, the target image). In this way, the backbone network outputs six feature maps of different sizes. Strides of the feature maps are (4, 8, 16, 32, 64, 128).

It may be understood that a receptive field of a high-layer network in a neural network structure is relatively large, and a semantic information representation capability is strong, but a resolution of a feature map is low, and a representation capability of geometric information is weak (spatial geometric feature details are lack); and a low-layer network has a relatively small receptive field, has a strong geometric detail information representation capability, and although a resolution is high, a semantic information representation capability is weak. In this embodiment of the present disclosure, feature maps of different layers are acquired as a data base for subsequent face detection, so that rich and comprehensive feature information of different layers can be used in subsequent face detection, thereby improving accuracy and comprehensiveness of face detection.

Step 206: Process the original feature maps by using a feature enhancement structure of the face detection network, to obtain an enhanced feature map corresponding to each original feature map; the feature enhancement structure being obtained by searching a search space, and the search space used for searching the feature enhancement structure being determined based on a detection objective of the face detection network and a processing object of the feature enhancement structure.

The feature enhancement structure (Automatic Feature Enhance Module, AutoFEM) is a network structure that is in the face detection network and that is used for implementing differentiation and robustness of enhanced features. Compared with the original feature map, the enhanced feature map has a stronger expression capability on the image feature, and has more semantic information.

When a search objective (feature enhancement structure) is a neural network structure, a search space, that is, a neural network search space, is used for searching for a feature enhancement structure. Searching the neural network search space for the feature enhancement structure may be: determining a quantity of nodes in the neural network search space, a connection relationship between the nodes, and a connection operation corresponding to the connection relationship, so as to obtain a determined network structure. The node represents a unit for buffering data in the neural network search space, or represents the buffered data itself in the neural network search space. The buffered data is, for example, a feature map outputted by a network layer.

The neural network search space for searching for the network structure may be determined according to an application objective and a processing object of the to-be-searched network structure. In this embodiment of the present disclosure, the to-be-searched network structure is applied to the face detection network, and is used for enhancing image features of more than one original feature map with different resolutions. Therefore, the neural network search space may be determined according to the detection objective of the face detection network and the processing object of the to-be-searched network structure, and may be specifically obtained by improving a common network structure applied to the face detection network to enhance image features of multiple images.

Specifically, the server may jointly input more than one original feature map corresponding to the target image into the feature enhancement structure, and the feature enhancement structure performs a series of operations on these images to output an enhanced feature map corresponding to each original feature map.

In an embodiment, the face detection network is configured to perform face detection on an image, and a function object of the feature enhancement structure is more than one original feature map with different resolutions. To obtain a precise detection result, feature fusion and semantic information enhancement may be performed on features of multiple scales. Then, based on the detection objective of the face detection network and the processing object of the feature enhancement structure, a search space used for searching for a feature fusion structure and a search space used for searching for a semantic enhancement structure are separately determined, and the feature enhancement structure is obtained by cascading the feature fusion structure and the semantic enhancement structure. The feature fusion structure may be specifically a feature pyramid structure, and a quantity of inputted feature maps is the same as a quantity of outputted feature maps. The semantic enhancement structure is specifically a semantic prediction structure, and includes more than one sub-structure. Each sub-structure is configured to enhance one of outputs of the feature pyramid structure, that is, a quantity of sub-structures is the same as a quantity of outputted feature maps of the feature pyramid structure.

In this way, feature fusion and semantic enhancement are successively performed on the original feature maps, which facilitates subsequent face detection. In addition, during semantic enhancement, an output of each feature pyramid structure is separately enhanced. Compared with performing the same processing on outputs of the feature pyramid structure by using the same model, differences can be reflected when faces of multiple scales are detected.

Step 208: Process the enhanced feature map by using a detection structure of the face detection network, to obtain a face detection result of the target image.

The detection structure is a network structure that is in the face detection network and that is used for implementing face detection according to a feature. The face detection result includes an image location of a detected face region in the to-be-processed image. The image location is, for example, image coordinates. The face detection result may further include a confidence level of the detected face region. The detected confidence level of the face region refers to a degree of credibility of the detected region as a face region, which may be generally represented by using a probability that the detected region is a face region, or may be referred to as a face probability.

Specifically, after the server inputs more than one enhanced feature map outputted by the feature enhancement structure into the detection structure, and performs a series of operations on these enhanced feature maps by the detection structure, the server outputs the detected image location of the face region in the to-be-processed image and a corresponding confidence level. During face detection, an image region that is detected as a face is generally displayed by using a face detection box. For the same real face in the target image, multiple overlapping region face detection boxes may exist, that is, image locations of multiple face regions exist. In this case, the server may filter a redundant face detection box by using non maximum suppression (NMS), and reserve an image location that is obtained by using a face detection box with a highest confidence level, to obtain a detected face region.

In the foregoing face detection method, after the target image is acquired, the face detection network is automatically invoked to process the target image. The feature extraction structure in the face detection network extracts the original feature maps from the target image. The feature enhancement structure of the face detection network processes the original feature maps to obtain the enhanced feature maps. The detection structure of the face detection network then obtains the face detection result of the target image based on the enhanced feature maps. There is more than one original feature map with different resolutions. In this way, original feature maps of multiple scales can include more abundant image information, which helps improve accuracy of subsequent face detection. In addition, the enhanced feature map obtained by processing the original feature map enhances feature differentiation and robustness, and further improves face detection accuracy. In addition, the feature enhancement structure is obtained by means of automatic searching, and a search space on which the search is based is determined together according to a detection objective of the face detection network and a processing object of the feature enhancement structure. On the one hand, great workload caused by an artificial design network structure is avoided, and performance is better than that of a manually designed network structure. On the other hand, the feature enhancement structure can be well applied to the face detection network, so that the face detection network can better perform face detection. In this way, detection accuracy is improved and labor costs are reduced.

In an embodiment, the feature enhancement structure includes a feature pyramid structure and a semantic prediction structure; and the feature pyramid structure and the semantic prediction structure are respectively obtained by means of independent search based on different neural network search spaces. The processing the original feature map by using a feature enhancement structure of the face detection network, to obtain an enhanced feature map corresponding to each original feature map includes: fusing the original feature maps by using the feature pyramid structure, to obtain a fused feature map corresponding to each of the original feature maps; and performing semantic enhancement on the fused feature maps by using the semantic prediction structure, to obtain an enhanced feature map corresponding to each fused feature map.

The feature enhancement structure (AutoFEM) includes a feature pyramid structure (AutoFEM-Feature Pyramid Network, AutoFEM-FPN) and a semantic prediction structure (AutoFEM-Context Prediction Module, AutoFEM-CPM). The feature pyramid structure is configured to perform feature fusion, and the semantic prediction structure is configured to enhance a fused result. Because the feature pyramid structure and the semantic prediction structure respectively implement different functions, the feature pyramid structure and the semantic prediction structure may be separately obtained by means of neural architecture search (NAS) based on different neural network search spaces, and the feature enhancement structure is obtained by means of cascading.

Specifically, the server may jointly input the more than one original feature map corresponding to the target image into the feature pyramid structure, and fuse the more than one original feature map by using the feature pyramid structure, so as to output a fused feature map corresponding to each original feature map. The server then inputs more than one fused feature map into the semantic prediction structure, enhances the more than one fused feature map by using the semantic prediction structure, and outputs an enhanced feature map corresponding to each fused feature map.

The feature pyramid structure is applied to the face detection network, and is configured to fuse more than one original feature map. Currently, some classical feature pyramid network structures exist in the machine learning field. The present disclosure improves a classical structure, creatively designs a super-network structure, and the feature pyramid structure (AutoFEM-FPN) of the present disclosure is searched from the super-network structure.

In an embodiment, a search process of the feature pyramid structure includes the following steps: determining, according to the detection objective of the face detection network, a first neural network search space for searching the feature pyramid structure; the first neural network search space including more than one node; and a connection manner between the nodes including a bottom-up connection, a top-down connection, and skip-connect; and constructing a search objective function, and searching the first neural network search space to determine weights of candidate connection operations between the nodes based on the search objective function; and reserving, at the end of the search, a connection operation with a maximum weight between the nodes to obtain the feature pyramid structure.

Specifically, according to the detection objective of the face detection network, a developer may refer to a classical structure that already exists in the machine learning field and that can serve the detection objective, such as a classical feature pyramid network FPN, PAN, or BiFPN. Based on these classical structures, a super-network structure of the first neural network search space is creatively designed, so as to search for the feature pyramid structure (AutoFEM-FPN) of the present disclosure from the first neural network search space.

Herein, it is an abstract concept to implement the objective of searching for the feature pyramid structure from the first neural network space. Specifically, the objective may be implemented by constructing an "objective search function". In this way, the search process may be specifically: obtaining a maximum value or a minimum value of the objective search function to determine a specific structure and a network parameter of the feature pyramid structure.

The super-network structure of the first neural network search space includes more than one node. The super-network structure includes a top-down structure (that is, a connection manner between nodes is a bottom-up connection), a bottom-up structure (that is, a connection manner between nodes is a bottom-up connection), and a skip-connect structure (that is, a connection manner between nodes is skip-connect).

The node represents a unit for buffering data in the neural network search space, or represents the buffered data itself in the neural network search space. The buffered data is, for example, a feature map. An up-and-down relationship in the two connection manners of the bottom-up connection and the top-down connection is extracted from the network layer according to the original feature map. For example, when an original feature map outputted by the first network layer is transferred to an original feature map outputted by the second network layer for operation, it is a bottom-up connection. When the original feature map outputted by the second network layer is transferred to the original feature map outputted by the first network layer for operation, it is a top-down connection. The skip-connect indicates that an input node is connected to a corresponding output node.

A process of searching for the feature pyramid structure in the first neural network search space includes a process of searching for and determining a connection operation corresponding to a bottom-up connection, a top-down connection, and skip-connect between nodes. A candidate operation set in the first neural network search space includes multiple separable convolution operations with different convolution parameters. The separable convolution operations may include a two-part convolution process, a depthwise convolution process, and a pointwise convolution process. Dilated/Atrous convolution may also be used as separable convolution.

Figure 4:
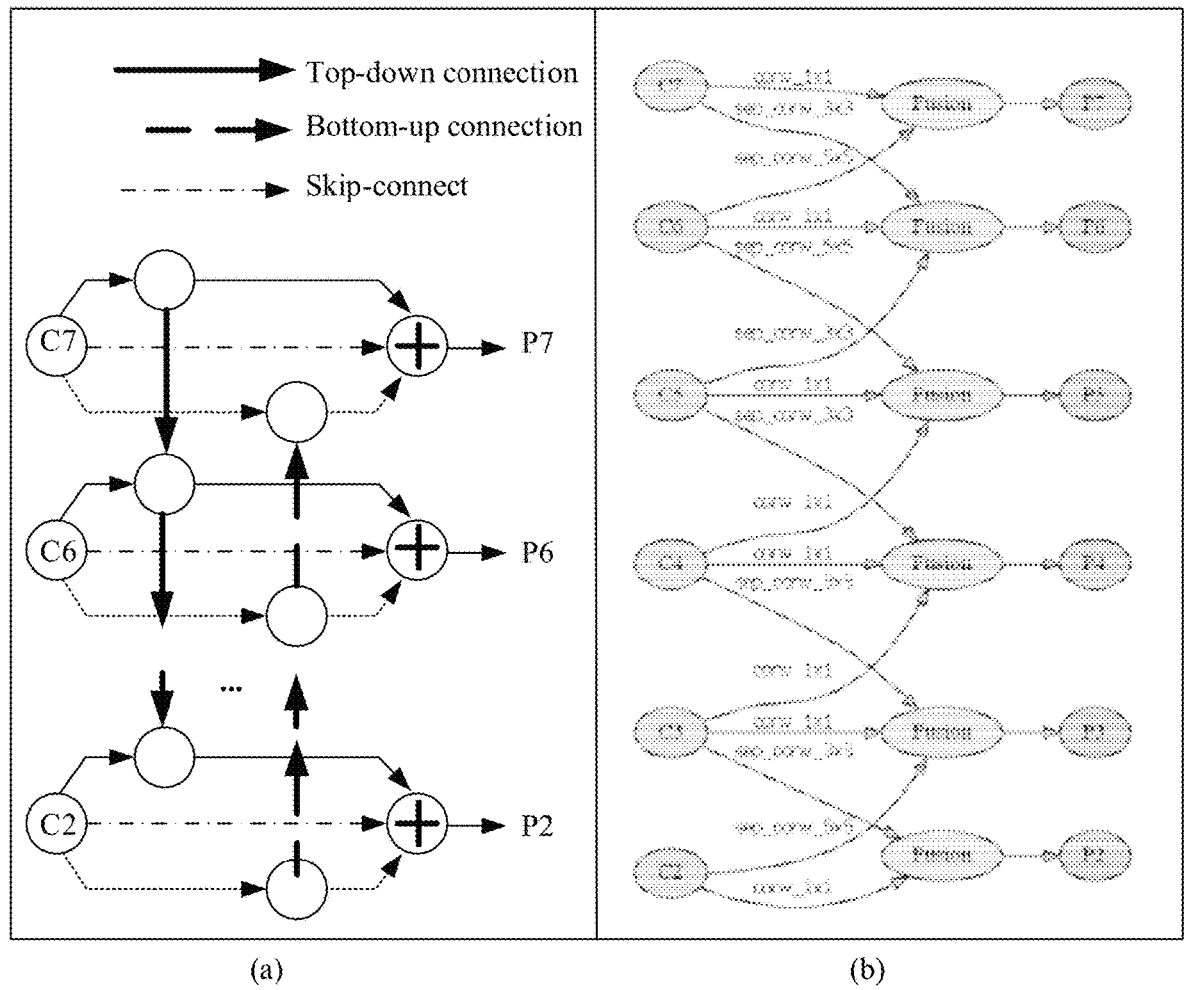
FIG. 4 is a schematic structural diagram of a feature pyramid structure according to an embodiment.

For example, FIG. 4 is a schematic structural diagram of a feature pyramid structure according to an embodiment. Referring to FIG. 4(a), this diagram is a schematic diagram of a super-network structure used for searching for a feature pyramid structure in an embodiment. In the figure, C2-C7 are six original feature maps of different scales that are outputted by a backbone network, and P2-P7 are fused feature maps corresponding to the outputted original feature maps. The super-network structure includes a top-down structure, a bottom-up structure, and a skip-connect structure. The candidate operation set corresponding to these connection structures is {1×1 convolution, 3×3 separable convolution, 5×5 separable convolution, 3×3, r=2 Dilated/Atrous convolution, 3×3, r=3 Dilated/Atrous convolution, 5×5, r=2 Dilated/Atrous convolution}, where 1×1 convolution is used for replacing an identically equal operation.

Further, the server may construct a search objective function, and search the first neural network search space to determine weights of candidate connection operations between the nodes based on the search objective function; and reserve, at the end of the search, a connection operation with a maximum weight between the nodes to obtain the feature pyramid structure. Weights of different connection operations are different, and a weight size represents importance of the connection operation.

The server may specifically search in a gradient-based search manner. In this case, the objective function may be a loss function, and gradient back propagation is performed by minimizing the loss function to optimize a parameter of a structure and a weight of an operation.

In one embodiment, a general formula for performing fusion in the feature pyramid structure is:

$$\begin{cases} P_7 = F_c(\beta_7^o O_7^o(C_7) + \beta_7^{bu} F_{down}(O_7^{bu}(P_6^{bu})) \times C_7) \\ P_6 = F_c(\beta_6^o O_6^o(C_6) + \beta_6^{td} F_{up}(O_6^{td}(P_7^{td})) \times C_6 + \beta_6^{bu} F_{down}(O_6^{bu}(P_5^{bu})) \times C_6) \\ \dots \\ P_2 = F_c(\beta_2^o O_2^o(C_2) + \beta_2^{td} F_{up}(O_2^{td}(P_3^{td} \times C_2))) \end{cases} \quad (1)$$

where $F_c()$ refers to a convolution operation, $F_{up}()$ refers to an upsampling operation of a bilinear difference, and $F_{down}()$ refers to a max pooling operation. $P_{i+1}^{td}$ is a top-down feature of $P_i$, which may also be referred to as a feedback feature map $P_i$. $P_{i-1}^{bu}$ is a bottom-up feature of $P_i$, which may also be referred to as a feedforward feature map of $P_i$. $O^o()$ refers to a connection operation corresponding to skip-connect, $O^{td}()$ refers to a connection operation corresponding to a top-down connection, and $O^{bu}()$ refers to a connection operation corresponding to a bottom-up connection. $\beta^o$ refers to a weight of a connection operation corresponding to skip-connect, $\beta^{td}$ refers to a weight of a connection operation corresponding to a top-down connection, and $\beta^{bu}$ refers to a weight of a connection operation corresponding to a bottom-up connection.

The server then calculates, in a gradient search manner, a probability of each candidate operation on each edge of the super-network structure, and then reserves a connection operation with a maximum probability to determine $O^o()$, $O^{td}()$, $O^{bu}()$, $\beta^o$, $\beta^{td}$, and $\beta^{bu}$ in formula (1), so as to obtain the feature pyramid structure in the present disclosure and a specific formula for performing feature map fusion in a pyramid. Still referring to FIG. 4, FIG. 4(b) is a specific feature pyramid structure obtained by searching from FIG. 4(a). It can be seen that each layer of the original feature map is fed back to a previous layer for feature map fusion after a specific operation, and is fed forward to a next layer for feature map fusion, and is connected to a fusion node of a current layer for feature map fusion.

In this embodiment, by automatically searching for the feature pyramid structure that can be used for implementing a detection objective service of the face detection network in the present disclosure, great workload caused by an artificial design network structure is avoided, performance is better than that of a manually designed network structure, and detection accuracy is improved and labor costs are reduced.

In an embodiment, the fusing the original feature maps by using the feature pyramid structure, to obtain a fused feature map corresponding to each of the original feature maps includes: jointly inputting the more than one original feature map into the feature pyramid structure; and fusing, in the feature pyramid structure, each original feature map, a feedforward feature map of each original feature map, and a feedback feature map of each original feature map to obtain a fused feature map of each original feature map; the feedforward feature map of each original feature map being obtained according to a previous-layer original feature map of the original feature map, the feedback feature map of each original feature map being obtained according to a lower-layer original feature map of the original feature map, and a sequence of the original feature map following a sequence of a network layer at which the original feature map is extracted.

The feedforward feature map is a feature map obtained after a specific convolution operation is performed on the previous-layer original feature map. The feedback feature map performs a specific convolution operation on the next-layer original feature map to obtain a feature map. Convolution operations performed by different layers to obtain the feedforward feature map or the feedback feature map may be the same or different.

Specifically, the server may process more than one original feature map according to the feature pyramid structure obtained by searching in the foregoing embodiment, to obtain the fused feature map corresponding to each original feature map. The performing fusion on the multiple feature maps may be specifically performing a convolution operation on the multiple feature maps.

For example, still referring to FIG. 4, for the first-layer original feature map C2, because C2 is the first-layer original feature map, there is no feedforward feature map, and a feedback feature map of C2 is a result obtained after a separable convolution operation (sep_conv_3×3) is performed on C3. A fused feature map P2 corresponding to C2 is obtained by fusing a result obtained after a convolution operation (conv_1×1) is performed on C2 with the feedback feature map of C2. For the second-layer original feature map C3, a feedforward feature map of C3 is a result obtained after a separable convolution operation (sep_conv_5×5) is performed on C2, and a feedback feature map of C3 is a result obtained after a separable convolution operation (sep_conv_3×3) is performed on C4. A fused feature map P3 corresponding to C3 is obtained by fusing a result obtained after a convolution operation (conv_1×1) is performed on C3, the feedforward feature map of C3, with the feedback feature map of C3. For the third-layer original feature map C4, a feedforward feature map of C4 is a result obtained after a convolution operation (conv_1×1) is performed on C3, and a feedback feature map of C4 is a result obtained after a convolution operation (sep_conv_3×3) is performed on C5. A fused feature map P4 corresponding to C4 is obtained by fusing a result obtained after a convolution operation (conv_1×1) is performed on C4, the feedforward feature map of C4, with the feedback feature map of C4. For the fourth-layer original feature map C5, a feedforward feature map of C5 is a result obtained after a convolution operation (conv_1×1) is performed on C4, and a feedback feature map of C5 is a result obtained after a separable convolution operation (sep_conv_5×5) is performed on C6. A fused feature map P5 corresponding to C5 is obtained by fusing a result obtained after a convolution operation (conv_1×1) is performed on C5, the feedforward feature map of C5, with the feedback feature map of C5. For the fifth-layer original feature map C6, a feedforward feature map of C6 is a result obtained after a convolution operation (sep_conv_3×3) is performed on C5, and a feedback feature map of C6 is a result obtained after a separable convolution operation (sep_conv_3×3) is performed on C7. A fused feature map P6 corresponding to C6 is obtained by fusing a result obtained after a convolution operation (conv_1×1) is performed on C6, the feedforward feature map of C6, with the feedback feature map of C6. For the sixth-layer original feature map C7, because C7 is the last-layer original feature map, there is no feedback feature map, and a feedforward feature map of C7 is a result obtained after a convolution operation (sep_conv_5×5) is performed on C6. A fused feature map P7 corresponding to C7 is obtained by fusing a result obtained after a convolution operation (conv_1×1) is performed on C7 with the feedforward feature map of C7.

In this embodiment, the feature pyramid structure is obtained by using automatic neural network search, and a quantity of structural parameters is small and a speed is fast, thereby effectively improving network detection efficiency. In addition, a large quantity of depthwise separable convolution is used in the feature pyramid structure obtained by searching, which can also improve network detection efficiency.

In an embodiment, the semantic prediction structure includes a sub-structure corresponding to each fused feature map. A search process of the semantic prediction structure includes: determining, according to the detection objective of the face detection network, a second neural network search space for searching the semantic prediction structure; the second neural network search space including more than one node and a directed edge connected to the more than one node, the node represents a unit for buffering data in the sub-structure, and the edge represents that data buffered by a start node of the edge is inputted into an end node of the edge after connection operation processing; and constructing a search objective function and simultaneously searching for more than one sub-structure of the semantic prediction structure in the second neural network search space based on the search objective function; reserving, at the end of the search, a connection operation with a maximum weight between nodes in each second neural network search space, to obtain the more than one sub-structure.

The semantic prediction structure includes the sub-structure corresponding to each fused feature map, that is, each fused feature map is enhanced by using a separate sub-structure. The fused feature maps with different resolutions are separately enhanced by using different network structures, which may reflect differences when detecting faces of multiple scales.

Specifically, the developer may refer to, according to the detection objective of the face detection network, a classical structure that already exists in the machine learning field and that can serve to implement the detection objective of the face detection network, such as a classical receptive field block (RFB), a finite element method (FEM) in a single shot multibox detector (SSD), or receptive field enhancement (RFE) in RefineFace. Based on a multi-branch structure formed by convolution of different sizes in these classical structures, a super-network structure of a second neural network search space is creatively designed, so as to search for the semantic prediction structure (AutoFEM-CPM) of the present disclosure from the second neural network search space.

The super-network structure of the second neural network search space includes more than one node and a directed edge connected to the more than one node, the node represents a unit for buffering data in the sub-structure, and the edge represents that data buffered by a start node of the edge is inputted into an end node of the edge after connection operation processing.

A process of searching the second neural network search space for the semantic prediction structure includes a process of searching and determining a quantity of nodes, a directed edge that connects these nodes, and a connection operation corresponding to the edge. An operation set from which the connection operation is selected includes various separable convolution operations with different convolution parameters. The separable convolution operations may include a two-part convolution process, a depthwise convolution process, and a pointwise convolution process. Dilated/Atrous convolution may also be used as separable convolution.

Herein, it is an abstract concept to implement the objective of searching for the semantic prediction structure from the second neural network space. Specifically, the objective may be implemented by constructing an "objective search function". In this way, the search process may be specifically: obtaining a maximum value or a minimum value of the objective search function to determine a specific structure and a network parameter of the feature pyramid structure. Because the feature pyramid structure and the semantic prediction structure are cascaded and used by the face detection network to perform enhancement processing on the feature map, an "objective search function" may be constructed to separately search for the feature pyramid structure and the semantic prediction structure.

Sub-structures of the semantic prediction structure are independent of each other, and are respectively applied to different fused feature maps. The server may search for all sub-structures of the semantic prediction structure at the same time.

In an embodiment, the constructing a search objective function and simultaneously searching for more than one sub-structure of the semantic prediction structure in the second neural network search space based on the search objective function includes: constructing a search objective function; determining weights of candidate connection operations between the nodes in the second neural network search space according to the search objective function at each time of weight optimization in the search process; determining, at each time of network parameter optimization in the search process, a weight based on previous weight optimization, using a network structure obtained by reserving a connection operation with a maximum weight between nodes as a network structure for optimizing the network parameter, and optimizing a network parameter of the network structure according to the search objective function; and overlapping the weight optimization and the network parameter optimization until a search end condition is met.

It may be understood that, when face detection is performed on an image, relatively small face regions may exist in the image. Generally, a large-resolution feature map is required to detect these relatively small face regions, which causes severe video RAM consumption. To resolve this problem, in the present disclosure, a search process of the semantic prediction structure is optimized, and video RAM consumption is reduced by means of stepwise optimization. The stepwise optimization includes weight optimization and network parameter optimization, and the weight optimization and the network parameter optimization overlap.

Specifically, for searching of each sub-structure of the semantic prediction structure, the server may construct a search objective function, and determine, according to the search objective function, a weight of each candidate connection operation between nodes in the second neural network search space, that is, perform weight optimization of one iteration. The server then uses a network structure obtained by reserving a connection operation with a maximum weight between nodes as a network structure for optimizing a network parameter, and optimizes a network parameter of the network structure according to a search objective function, that is, performs network parameter optimization of one iteration. The server performs weight optimization and network parameter optimization in an overlapping manner, and ends searching when a search end condition is met. The server may specifically search in a gradient-based search manner. In this case, the objective function may be a loss function, and gradient back propagation is performed by minimizing the loss function to optimize a parameter of a structure and a weight of an operation.

Figure 5:
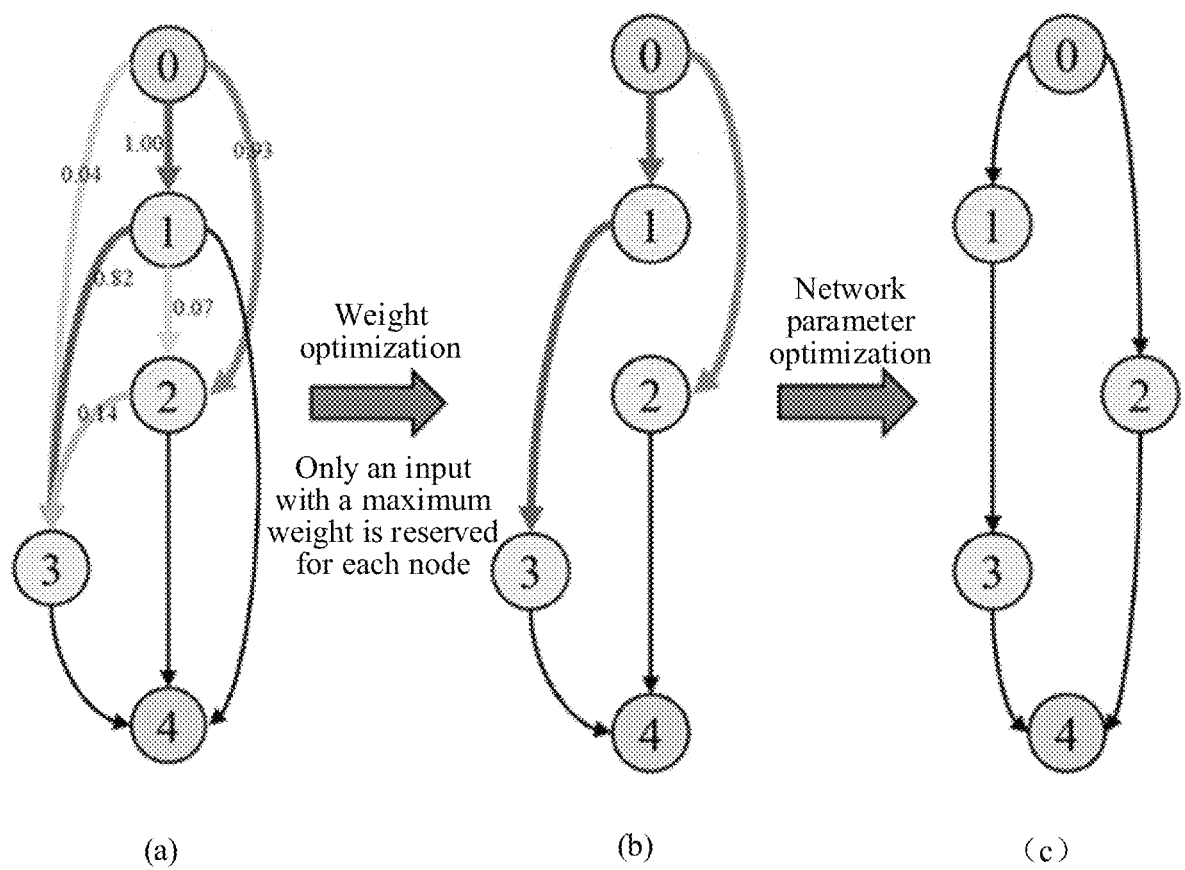
FIG. 5 is a schematic principle diagram of searching for semantic prediction structure according to an embodiment.

For example, FIG. 5 is a schematic principle diagram of searching for semantic prediction structure according to an embodiment. Referring to FIG. 5, the server performs weight optimization of one iteration to determine weights of candidate connection operations between nodes in the second neural network search space, as shown in FIG. 5(a). Each value represents a weight of a corresponding edge. The server may use a network structure obtained by reserving a connection operation with a maximum weight between nodes as a network structure for optimizing a network parameter, as shown in FIG. 5(b). The server then performs network parameter optimization based on the network structure to obtain the network shown in FIG. 5(c). That is, the server determines a structure by means of weight optimization, and then optimizes a network parameter of the structure based on the current structure.

Figure 6:
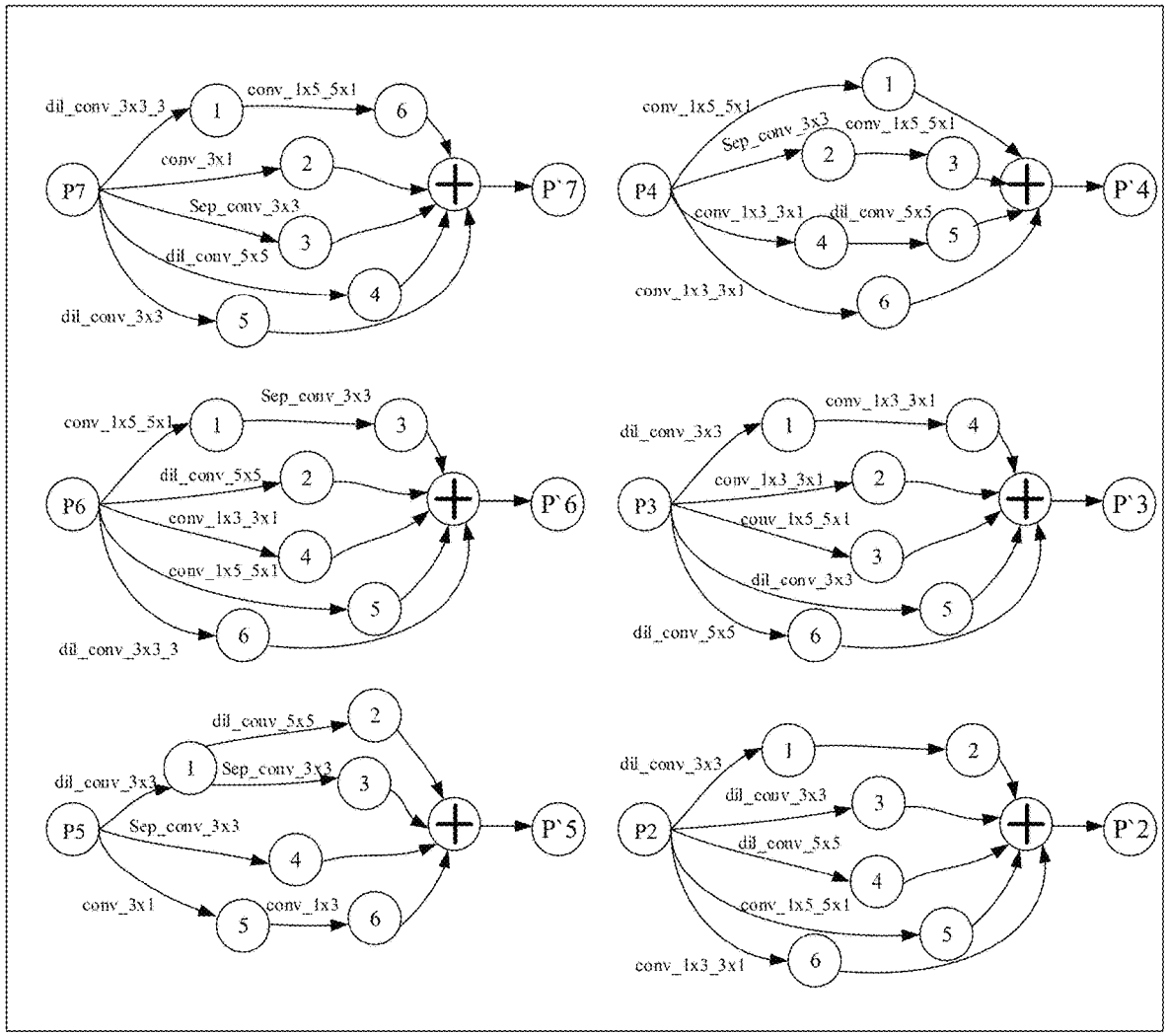
FIG. 6 is a schematic structural diagram of a semantic prediction structure according to an embodiment.

FIG. 6 is a schematic structural diagram of a semantic prediction structure according to an embodiment. FIG. 6 is six independent AutoFEM-CPM sub-structures obtained by searching based on the search principle shown in FIG. 5. Each sub-AutoFEM-CPM sub-structure enhances one fused feature map (Pi), and outputs a corresponding enhanced feature map (P'i). dil_conv represents dilated convolution, Sep_conv represents separable convolution, cony represents standard convolution, and n×m represents a convolution kernel parameter.

In one embodiment, in a process of searching for AutoFEM-CPM, a candidate operation set is {1×1 convolution, 3×3 separable convolution, 5×5 separable convolution, 1×3 convolution, 3×1 convolution, 1×3 convolution and 3×1 convolution combination, 1×5 convolution, 5×1 convolution, 1×5 convolution and 5×1 convolution combination, 3×3 r=2 dilated convolution, 3×3 r=3 dilated convolution, 5×5 r=2 dilated convolution}. r represents an expansion coefficient of the convolution kernel. The candidate operation uses a large quantity of depthwise separable convolution, which can improve network detection efficiency.

In the foregoing embodiment, by automatically searching for the feature pyramid structure that can be used for implementing a detection objective service of the face detection network in the present disclosure, great workload caused by an artificial design network structure is avoided, performance is better than that of a manually designed network structure, and detection accuracy is improved and labor costs are reduced. In addition, when a network parameter is optimized, only a network structure formed by reserving a connection operation with a maximum weight between current nodes is considered, thereby reducing video RAM consumption.

In an embodiment, the semantic prediction structure includes a sub-structure corresponding to each fused feature map. The performing semantic enhancement on the fused feature maps by using the semantic prediction structure, to obtain an enhanced feature map corresponding to each fused feature map includes: inputting each fused feature map into a corresponding sub-structure; and processing, in each sub-structure, the fused feature map inputted into the sub-structure, to obtain an enhanced feature map corresponding to the fused feature map inputted into the sub-structure.

In an embodiment, the sub-structure includes more than one node and a directed edge connected to the more than one node, the node represents a unit for buffering data in the sub-structure, the edge represents that data buffered by a start node of the edge is inputted into an end node of the edge after connection operation processing, and the more than one node includes an input node, an output node, and a leaf node between the input node and the output node. The processing, in each sub-structure, the fused feature map inputted into the sub-structure, to obtain an enhanced feature map corresponding to the fused feature map inputted into the sub-structure includes: inputting, in each sub-structure, a fused feature map stored in the input node into an end node of each edge in the sub-structure after connection operation processing corresponding to the edge; and converging a leaf node that is only an end node to the output node, and outputting, by using the output node, an enhanced feature map obtained by means of fusion.

Specifically, the server may separately input each fused feature map into a corresponding sub-structure. In each sub-structure, a to-be-processed fused feature map is stored in an input node, or the input node is a to-be-processed feature fusion map. According to a direction of each directed edge in the sub-structure, the to-be-processed fused feature map is processed by a corresponding connection operation on each edge, and is inputted to an end node on each edge; and a leaf node that is only an end node is converged to the output node, and an enhanced feature map obtained by means of fusion is outputted by using the output node. Herein, not outputs of all leaf nodes are converged to an output node, but a leaf node that is only an end node is converged to the output node, so that a calculation amount and a memory cost can be reduced while ensuring detection accuracy.

For example, referring to a sub-structure in the lower right corner of FIG. 6, an input node is a fused feature map P2, and is inputted into a node 1 after undergoing a dilated convolution operation (dil_conv_3×3), an input node 3 after undergoing a dilated convolution operation (dil_conv_3×3), an input node 4 after undergoing a dilated convolution operation (dil_conv_5×5), an input node 5 after undergoing a convolution operation (conv_1×5 5×1), and an input node 6 after undergoing a convolution operation (conv_1×3 3×1). The node 1 is inputted into a node 2 after undergoing a dilated convolution operation (dil_conv_3×3). The nodes 2, 3, 4, 5, and 6 serving only as leaf nodes are converged to the output node for fusion to output an enhanced feature map P'2. The node 1 is not only an end node of the input node, but also a start node of the node 2. Therefore, the node 1 is not converged to the output node.

In this embodiment, the semantic prediction structure is obtained by using automatic neural network search, and a quantity of structural parameters is small and a speed is fast, thereby effectively improving network detection efficiency. In addition, a large quantity of depthwise separable convolution is used in the semantic prediction structure obtained by searching, which can also improve network detection efficiency. In addition, in the semantic prediction structure, only the leaf node that is only an end node is converged to the output node, and a calculation amount and a memory cost can be reduced while ensuring detection accuracy.

In the foregoing embodiment, the feature enhancement structure is implemented by using two parts: the feature pyramid structure and the semantic prediction structure, features of multiple scales are fused efficiently by using the feature pyramid structure, and then semantic information is enhanced by using the semantic prediction structure, so that all features are enhanced by using reasonable classification and regression. In addition, the feature pyramid structure and the semantic prediction structure are searched based on a differentiable neural network architecture search method. In this way, a quantity of model parameters of the face detection network is small and the face detection network is fast.

In an embodiment, a training process of the face detection network includes the following steps: determining, according to the detection objective of the face detection network, a first neural network search space for searching the feature pyramid structure and a second neural network search space for searching the semantic prediction structure; constructing a network training loss function; separately searching for the feature pyramid structure from the first neural network search space according to the network training loss function, and searching for the semantic prediction structure from the second neural network search space; and continuing to jointly train a first branch and a second branch of the face detection network according to the network training loss function; the first branch including the feature extraction structure and the detection structure; the second branch including the feature extraction structure, the feature pyramid structure, the semantic prediction structure, and the detection structure; and when the face detection network is applied, an output of the second branch being an output of the face detection network.

Specifically, the developer may determine, according to the detection objective of the face detection network and by using a classical structure that already exists in the machine learning field and that can serve to implement the detection objective of the face detection network, the first neural network search space for searching the feature pyramid structure, the second neural network search space for searching the semantic prediction structure, and a composition structure of the face detection network.

The face detection network may form two branches by using two types of feature maps, perform branching after the feature extraction structure, and directly connect the original feature map to the detection structure as a detection object of a first branch. In addition, the original feature map is inputted into the feature enhancement structure for processing, so that the obtained enhanced feature map is connected to the detection structure as a detection object of a second branch. For example, still with reference to FIG. 3, after the target image is inputted into the backbone network, the six original feature maps outputted by the backbone network are directly inputted into the detection structure (detection head) to perform face detection to obtain a first face detection result. In another aspect, the first face detection result is inputted into the feature enhancement structure (AutoFEM) to output an enhanced feature map, and then the enhanced feature map is inputted into the detection structure (detection head) to perform face detection to obtain a second face detection result. The two branches share a detection structure (detection head), and the detection structure (detection head) implements detection by using a convolution operation.

Further, the developer may design a network training loss calculation manner of the face detection network based on the composition structure of the face detection network and the detection objective of the face detection network. The server constructs a network training loss function according to the network training loss calculation manner, separately searches for the feature pyramid structure from the first neural network search space according to the network training loss function, and searches for the semantic prediction structure from the second neural network search space. After cascading the feature pyramid structure and the semantic prediction structure, the server adds them to the face detection network, and continues to jointly train the first branch and the second branch of the face detection network according to the network training loss function. When the first branch and the second branch of the face detection network are jointly trained, weights of connection operations of edges in the feature pyramid structure and the semantic prediction structure are retrained.

The network training loss calculation manner is specifically a loss superposition of multiple tasks, including a regression loss and a classification loss. The regression loss may be specifically a distance-based regression loss, and the classification loss may be specifically a margin-based classification loss. The first branch is corresponding to one multi-task loss function, the second branch is corresponding to one multi-task loss function, and the first branch and the second branch are jointly trained. In this case, the two multi-task loss functions are summated in a weighted manner to obtain a common corresponding total multi-task loss function.

In an embodiment, the feature pyramid structure and the semantic prediction structure are cascaded to perform enhancement processing on the feature map by the face detection network. Therefore, a search objective function for searching the feature pyramid structure, a search objective function for searching the semantic prediction structure, and the multi-task loss functions of the first branch and the second branch in the jointly trained face detection network may be set to the same function.

In the foregoing embodiment, the face detection network is a dual-branch structure, branching is performed after the feature extraction structure, the feature extraction structure is directly connected to the detection structure as the first branch, and the feature extraction structure is processed by using the feature enhancement model before being connected to the detection structure as the second branch. During training of the face detection network, the two branches cooperate in training, so as to assist in training the second branch by using the first branch, thereby improving training efficiency and effect. When the face detection network is used, the first branch is ignored and an output of only the second branch is used, and a network calculation amount is not increased. In addition, there is more than one original feature map with different resolutions. In this way, original feature maps of multiple scales can include more abundant image information, which helps improve accuracy of subsequent face detection. The enhanced feature map obtained by processing the original feature map enhances feature discrimination and robustness, and further improves face detection accuracy. In addition, the feature enhancement structure is obtained by searching based on a neural network search space, great workload caused by an artificial design network structure is avoided, performance is better than that of a manually designed network structure, and detection accuracy is improved and labor costs are reduced.

Figure 7:
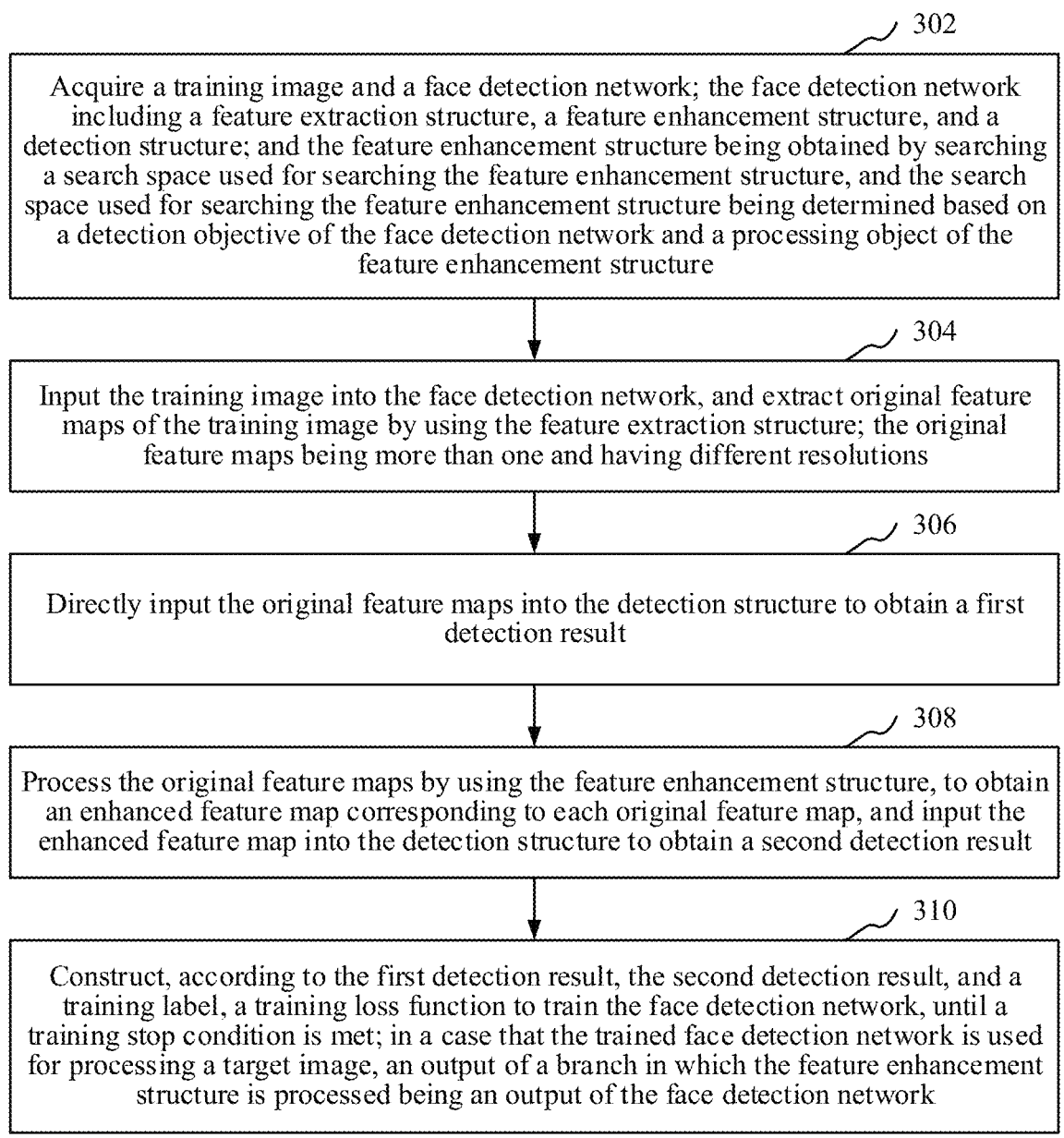
FIG. 7 is a schematic flowchart of a neural network training method according to an embodiment.

In an embodiment, as shown in FIG. 7, a training method for an image detection neural network is provided, and the method is applied to the server 104 in FIG. 1 as an example for description. The method includes the following steps:

Step 702: Acquire a training image and a face detection network; the face detection network including a feature extraction structure, a feature enhancement structure, and a detection structure; and the feature enhancement structure being obtained by searching a search space, and the search space used for searching the feature enhancement structure being determined based on a detection objective of the face detection network and a processing object of the feature enhancement structure.

The training image is an image sample used as training data, and has a corresponding training label. The training label of the training image may be specifically a real image location of a face region (face rectangular box) in the training image. The feature enhancement structure included in the face detection network is obtained based on a neural network search space search. When the face detection network is trained, weights corresponding to connection operations in the feature enhancement structure when the search is completed are discarded, and training is performed again when the face detection network is trained.

Step 704: Input the training image into the face detection network, and extract original feature maps of the training image by using the feature extraction structure; the original feature maps having different resolutions.

Step 706: Directly input the original feature maps into the detection structure to obtain a first detection result.

Step 708: Process the original feature maps by using the feature enhancement structure, to obtain an enhanced feature map corresponding to each original feature map, and input the enhanced feature map into the detection structure to obtain a second detection result.

Step 710: Construct, according to the first detection result, the second detection result, and a training label, a training loss function to train the face detection network, until a training stop condition is met; when the trained face detection network is used for processing a target image, an output of a branch in which the feature enhancement structure is processed being an output of the face detection network.

The detection branch in which the first detection result is located is used for assisting in training the branch in which the second detection result is located. When the face detection network is actually used for processing the target image, an output of the second branch is an output of the face detection network, and no additional calculation cost is introduced.

Still referring to FIG. 3, when the face detection network is being trained, the first detection result and the training label that are outputted by the first branch may be used for constructing a training loss function (First shot DRMC Loss) of the first branch, the second detection result and the training label that are outputted by the second branch may be used for constructing a training loss function (Second shot DRMC Loss) of the second branch, and then the two training loss functions are balanced by using weights to obtain a total training loss function. The training loss function may be specifically a multi-task loss function, including a regression loss and a classification loss.

In the foregoing training method for an image detection neural network, the face detection network is a dual-branch structure, branching is performed after the feature extraction structure, the feature extraction structure is directly connected to the detection structure as a first branch, and the feature extraction structure is processed by using the feature enhancement model before being connected to the detection structure as a second branch. During training of the face detection network, the two branches cooperate in training, so as to assist in training the second branch by using the first branch, thereby improving training efficiency and effect. When the face detection network is used, the first branch is ignored and an output of only the second branch is used, and a network calculation amount is not increased. In addition, there is more than one original feature map with different resolutions. In this way, original feature maps of multiple scales can include more abundant image information, which helps improve accuracy of subsequent face detection. The enhanced feature map obtained by processing the original feature map enhances feature discrimination and robustness, and further improves face detection accuracy. In addition, the feature enhancement structure is obtained by means of automatic searching, and a search space on which the search is based is determined together according to a detection objective of the face detection network and a processing object of the feature enhancement structure. On the one hand, great workload caused by an artificial design network structure is avoided, and performance is better than that of a manually designed network structure. On the other hand, the feature enhancement structure can be well applied to the face detection network, so that the face detection network can better perform face detection. In this way, detection accuracy is improved and labor costs are reduced.

In an embodiment, the feature enhancement structure includes a feature pyramid structure and a semantic prediction structure. The acquiring a training image set and a face detection network includes: acquiring a training image set; determining, according to the detection objective of the face detection network, a first neural network search space for searching the feature pyramid structure and a second neural network search space for searching the semantic prediction structure; searching for the feature pyramid structure from the first neural network search space; and searching for the semantic prediction structure from the second neural network search space. The processing the original feature maps by using the feature enhancement structure, to obtain an enhanced feature map corresponding to each original feature map, and inputting the enhanced feature map into the detection structure to obtain a second detection result includes: processing the original feature maps by using the feature pyramid structure, to obtain a fused feature map corresponding to each original feature map; processing the fused feature map by using the semantic prediction structure, to obtain a fused feature map corresponding to each original feature map; and inputting the enhanced feature map into the detection structure to obtain the second detection result.

Specifically, the feature pyramid structure and the semantic prediction structure are used in the face detection network. In this case, the training image set for training the face detection network may be used for searching the search space for the feature pyramid structure and the semantic prediction structure. After the feature map is extracted from the training image set by using the feature extraction structure, the feature map is used as an input to the search space to search for the feature pyramid structure and the semantic prediction structure. For a specific process of searching for the feature pyramid structure and the semantic prediction structure, refer to the detailed description in the foregoing embodiments.

In an embodiment, the first neural network search space includes more than one node; and a connection manner between the nodes includes a bottom-up connection, a top-down connection, and skip-connect. The searching for the feature pyramid structure from the first neural network search space includes: constructing a search objective function, and searching the first neural network search space to determine weights of candidate connection operations between the nodes based on the search objective function; and reserving, at the end of the search, a connection operation with a maximum weight between the nodes to obtain the feature pyramid structure.

In an embodiment, the second neural network search space includes more than one node and a directed edge connected to the more than one node, the node represents a unit for buffering data in the second neural network search space, and the edge represents that data buffered by a start node of the edge is inputted into an end node of the edge after connection operation processing. The searching for the semantic prediction structure from the second neural network search space includes: constructing a search objective function and simultaneously searching for more than one sub-structure of the semantic prediction structure in the second neural network search space based on the search objective function; a quantity of sub-structures being the same as a quantity of fused feature maps; and reserving, at the end of the search, a connection operation with a maximum weight between nodes in each second neural network search space, to obtain the more than one sub-structure.

In an embodiment, the constructing a search objective function and simultaneously searching for more than one sub-structure of the semantic prediction structure in the second neural network search space based on the search objective function includes: constructing a search objective function; determining weights of candidate connection operations between the nodes in the second neural network search space according to the search objective function at each time of weight optimization in the search process; determining, at each time of network parameter optimization in the search process, a weight based on previous weight optimization, using a network structure obtained by reserving a connection operation with a maximum weight between nodes as a network structure for optimizing the network parameter, and optimizing a network parameter of the network structure according to the search objective function; and overlapping the weight optimization and the network parameter optimization until a search end condition is met.

It may be understood that, during determining of the super-network structure for searching for the feature pyramid structure and the semantic prediction structure, the classical FPN, SSD, and RefineFace may be referred to. These classical structures are all excellent structures used for face detection. Therefore, the face detection network in the present disclosure may be well applied to a face detection scenario, and searching the super-network structure for the feature pyramid structure and the semantic prediction structure is also more suitable for face detection. In addition, face detection is a most basic and important process in a face application, and may serve face recognition, face registration, and the like. Face detection is also widely used in many application scenarios, such as a public place such as a store, a supermarket, or a subway, the education field, and the security protection field. The present disclosure further provides an application scenario of face detection, and the application scenario uses the foregoing face detection method. Specifically, an application of the face detection method in the application scenario is as follows:

Step (1): Acquire a target image.

The target image is, for example, a camera picture, a photo, an image frame in a video, and a cartoon.

Step (2): Input the target image into a face detection network to obtain original feature maps extracted by a classification backbone network structure in the face detection network; the original feature maps having different resolutions.

Step (3): Fuse the original feature maps by using a feature pyramid structure in the face detection network, to obtain a fused feature map corresponding to each of the original feature maps. The feature pyramid structure is obtained by searching based on a first neural network search space. A super-network structure of the first neural network search space is obtained by improving a classical feature pyramid structure. The super-network structure of the first neural network search space includes more than one node, and a connection manner between the nodes includes a bottom-up connection, a top-down connection, and skip-connect.

Step (4): Separately perform semantic enhancement on the fused feature map by using each sub-structure of a semantic prediction structure, to obtain an enhanced feature map corresponding to each fused feature map. Each sub-structure of the semantic prediction structure is obtained by searching based on a second neural network search space. The second neural network search space is obtained by improving a common network structure that includes multi-branch structures formed by convolution with different sizes. The second neural network search space includes more than one node and a directed edge connected to the more than one node. The node represents a unit for buffering data in the second neural network search space, the edge represents that data buffered by a start node of the edge is inputted into an end node of the edge after connection operation processing, and the more than one node includes an input node, an output node, and a leaf node between the input node and the output node.

Step (5): Perform a convolution operation on the enhanced feature map by using a detection structure of the face detection network, to obtain a face coordinate and a face probability that are detected from the target image.

Step (6): Filter a redundant face box by using non maximum suppression, and reserve only one face coordinate with a maximum face probability for each face in the target image.

In addition, the face detection method provided in the present disclosure exceeds a previous classical method (State-Of-The-Art, SOTA) on the list of two face detection data sets WIDERFACE and FDDB, to obtain the first place.

Figure 8:
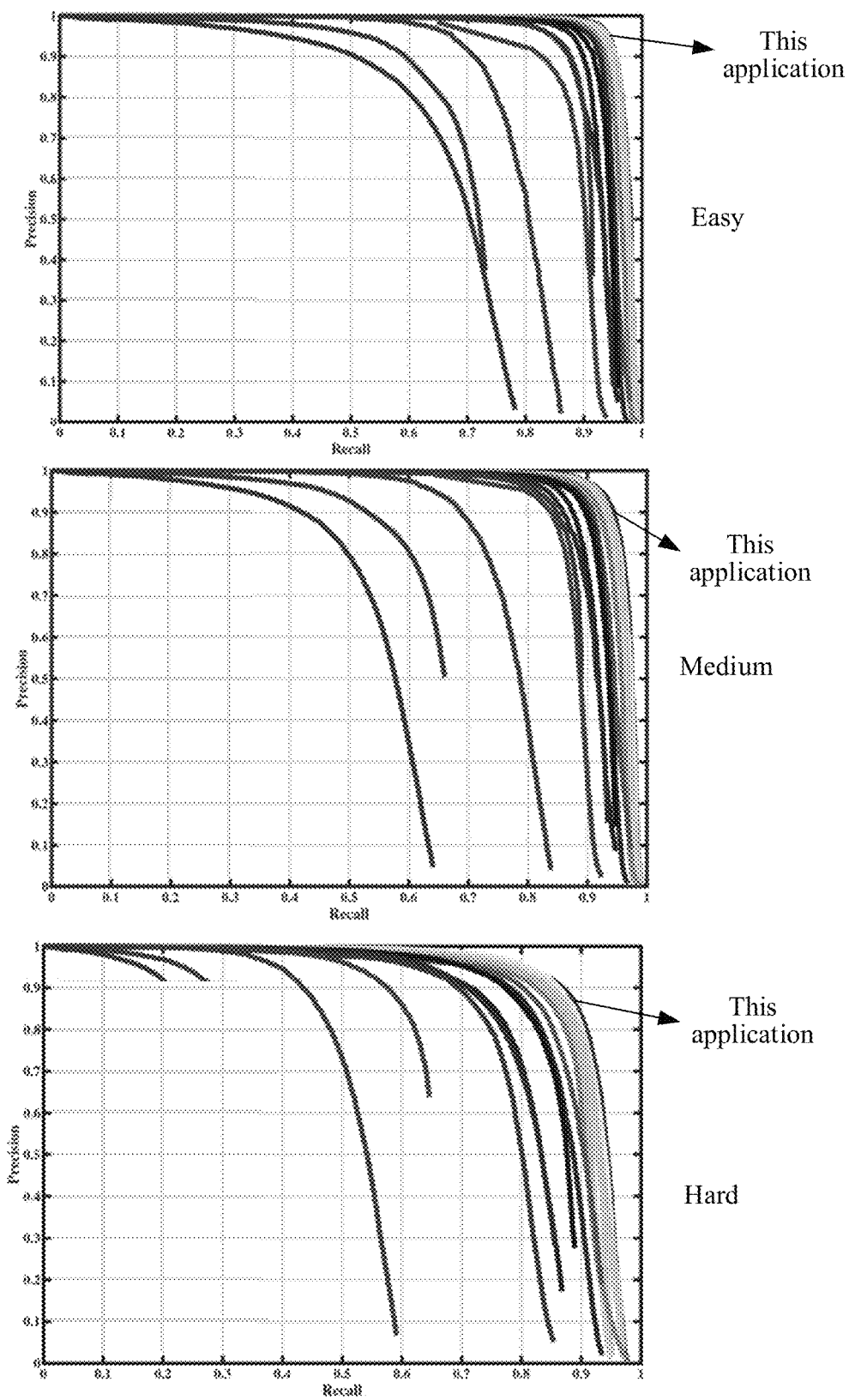
FIG. 8 is a comparison diagram of detection results of a face detection method in the present disclosure according to an embodiment and an existing face detection algorithm in three evaluation subsets of WIDERFACE.

FIG. 8 is a comparison diagram of detection results of a face detection method in the present disclosure and an existing face detection algorithm in three evaluation subsets of WIDERFACE. A vertical coordinate indicates precision, and a horizontal coordinate indicates recall. In the figure, a precision-recall relationship curve corresponding to the present disclosure is the outermost curve, and the other curves are precision-recall relationship curves corresponding to other existing face detection methods, such as Refine-FACE, AInnoFACE, and DFS. In a "Easy" evaluation subset, face detection precision of the present disclosure may reach 0.971. In a "Medium" evaluation subset, face detection precision of the present disclosure may reach 0.965. In a "Hard" evaluation subset, face detection precision of the present disclosure may reach 0.922.

Figure 9:
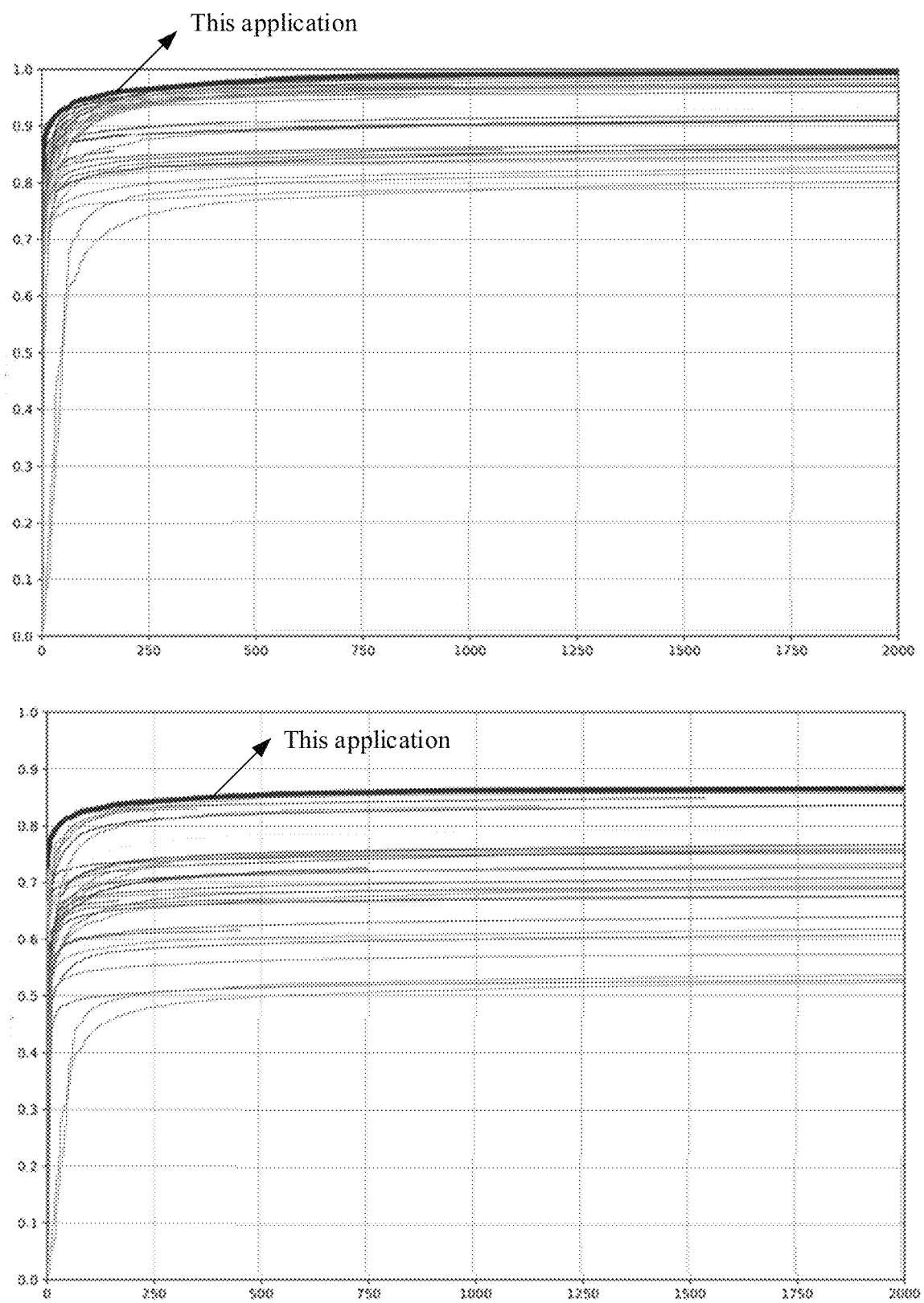
FIG. 9 is a comparison diagram of ROC curves of a face detection method in the present disclosure according to an embodiment and an existing face detection algorithm on an FDDB data set.

FIG. 9 is a comparison diagram of ROC curves of a face detection method in the present disclosure and an existing face detection algorithm on an FDDB data set. The upper part of the figure shows discontinuous ROC curves, and the lower part of the figure shows continuous ROC curves. A horizontal coordinate indicates false positive, and a vertical coordinate indicates a true positive rate. In the figure, an ROC curve corresponding to the present disclosure is the outermost curve, and the other curves are ROC curves corresponding to other existing face detection methods. On a discontinuous ROC curve, a true positive rate of the present disclosure may reach 0.9911. On a continuous ROC curve, a true positive rate of the present disclosure may reach 0.8625.

Figure 10:
FIG. 10 is a schematic diagram of a visual face detection result in a target image.

For example, FIG. 10 is a schematic diagram of a visual face detection result in a target image. Referring to FIG. 10, the figure shows face detection result diagrams in four variable scenarios: modality (for example, an infrared image), expression (for example, various face postures or expressions), occlusion (for example, wearing a mask), and scale (for example, a large quantity of faces). It can be seen that each face is bounded by a face detection box, that is, each face is detected. It can be learned that, under impact of various factors such as scale, posture, expression, occlusion, and light, the face detection method provided in this embodiment of the present disclosure can still accurately detect all faces in a to-be-processed image.

It is to be understood that, although the steps are displayed sequentially according to the instructions of the arrows in the flowcharts of the embodiments, the steps are not necessarily performed sequentially according to the sequence instructed by the arrows. Unless clearly specified in this specification, there is no strict sequence limitation on the execution of the steps, and the steps may be performed in another sequence. In addition, at least some steps in the flowcharts of the foregoing embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 11:
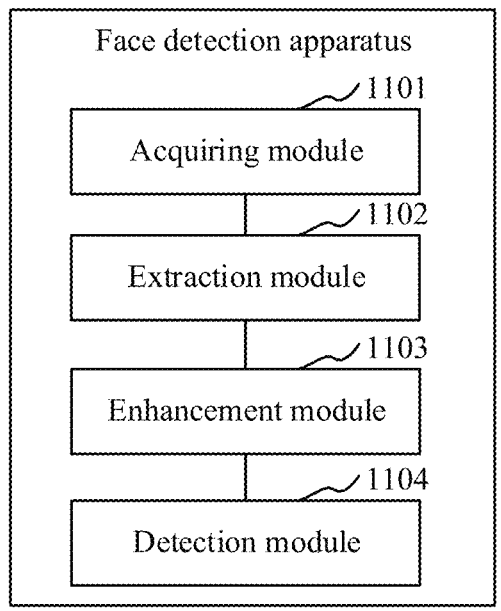
FIG. 11 is a structural block diagram of a face detection apparatus according to an embodiment.

In an embodiment, as shown in FIG. 11, a face detection apparatus is provided. The apparatus may use a software module or a hardware module, or a combination thereof so as to be a part of a computer device. The apparatus specifically includes an acquiring module 1101, an extraction module 1102, an enhancement module 1103, and a detection module 1104.

The acquiring module 1101 is configured to acquire a target image;

the extraction module 1102 is configured to invoke a face detection network, and process the target image by using a feature extraction structure of the face detection network, to obtain original feature maps corresponding to the target image; the original feature maps having different resolutions;

the enhancement module 1103 is configured to process the original feature maps by using a feature enhancement structure of the face detection network, to obtain an enhanced feature map corresponding to each original feature map; the feature enhancement structure being obtained by searching a search space, and the search space used for searching the feature enhancement structure being determined based on a detection objective of the face detection network and a processing object of the feature enhancement structure; and the detection module 1104 is configured to process the enhanced feature map by using a detection structure of the face detection network, to obtain a face detection result of the target image.

In an embodiment, the feature enhancement structure includes a feature pyramid structure and a semantic prediction structure; and a search space used for searching for a feature pyramid structure and a search space used for searching for a semantic prediction structure are respectively determined based on a detection objective of the face detection network and a processing object of the feature enhancement structure; the feature pyramid structure is configured to fuse the original feature maps to obtain a same quantity of outputs; the semantic prediction structure includes more than one sub-structure; and each of the sub-structures is configured to enhance one of the outputs of the feature pyramid structure.

In an embodiment, the extraction module 1102 is further configured to input the target image into the face detection network; and acquire feature maps separately outputted by more than one network layer in the feature extraction structure of the face detection network, to obtain more than one original feature map corresponding to the target image.

In an embodiment, the feature enhancement structure includes a feature pyramid structure and a semantic prediction structure; and the feature pyramid structure and the semantic prediction structure are respectively obtained by means of independent search based on different neural network search spaces. The enhancement module 1103 is further configured to fuse the original feature maps by using the feature pyramid structure, to obtain a fused feature map corresponding to each of the original feature maps; and perform semantic enhancement on the fused feature maps by using the semantic prediction structure, to obtain an enhanced feature map corresponding to each fused feature map.

In an embodiment, the enhancement module 1103 is further configured to jointly input the more than one original feature map into the feature pyramid structure; and fuse, in the feature pyramid structure, each original feature map, a feedforward feature map of each original feature map, and a feedback feature map of each original feature map to obtain a fused feature map of each original feature map; the feedforward feature map of each original feature map being obtained according to a previous-layer original feature map of the original feature map, the feedback feature map of each original feature map being obtained according to a lower-layer original feature map of the original feature map, and a sequence of the original feature map following a sequence of a network layer at which the original feature map is extracted.

In an embodiment, the face detection apparatus further includes a training module, configured to determine, according to the detection objective of the face detection network, a first neural network search space for searching the feature pyramid structure; the first neural network search space including more than one node; and a connection manner between the nodes including a bottom-up connection, a top-down connection, and skip-connect; and construct a search objective function, and search the first neural network search space to determine weights of candidate connection operations between the nodes based on the search objective function; and reserve, at the end of the search, a connection operation with a maximum weight between the nodes to obtain the feature pyramid structure.

In an embodiment, the semantic prediction structure includes a sub-structure corresponding to each fused feature map. The enhancement module 1103 is further configured to separately input each fused feature map into a corresponding sub-structure; and process, in each sub-structure, the fused feature map inputted into the sub-structure, to obtain an enhanced feature map corresponding to the fused feature map inputted into the sub-structure.

In an embodiment, the sub-structure includes more than one node and a directed edge connected to the more than one node, the node represents a unit for buffering data in the sub-structure, the edge represents that data buffered by a start node of the edge is inputted into an end node of the edge after connection operation processing, and the more than one node includes an input node, an output node, and a leaf node between the input node and the output node. The enhancement module 1103 is further configured to: input, in each sub-structure, a fused feature map stored in the input node into an end node of each edge in the sub-structure after connection operation processing corresponding to the edge; and converge a leaf node that is only an end node to the output node, and output, by using the output node, an enhanced feature map obtained by means of fusion.

In an embodiment, the semantic prediction structure includes a sub-structure corresponding to each fused feature map. The training module is further configured to determine, according to the detection objective of the face detection network, a second neural network search space for searching the semantic prediction structure; the second neural network search space including more than one node and a directed edge connected to the more than one node, the node represents a unit for buffering data in the second neural network search space, and the edge represents that data buffered by a start node of the edge is inputted into an end node of the edge after connection operation processing; and construct a search objective function and simultaneously search for more than one sub-structure of the semantic prediction structure in the second neural network search space based on the search objective function; reserve, at the end of the search, a connection operation with a maximum weight between nodes in each second neural network search space, to obtain the more than one sub-structure.

In an embodiment, the training module is further configured to construct a search objective function; determine weights of candidate connection operations between the nodes in the second neural network search space according to the search objective function at each time of weight optimization in the search process; determine, at each time of network parameter optimization in the search process, a weight based on previous weight optimization, use a network structure obtained by reserving a connection operation with a maximum weight between nodes as a network structure for optimizing the network parameter, and optimize a network parameter of the network structure according to the search objective function; and overlap the weight optimization and the network parameter optimization until a search end condition is met.

In an embodiment, the connection operation includes a separable convolution operation.

In an embodiment, the training module is further configured to determine, according to the detection objective of the face detection network, a first neural network search space for searching the feature pyramid structure and a second neural network search space for searching the semantic prediction structure; construct a network training loss function; separately search for the feature pyramid structure from the first neural network search space according to the network training loss function, and search for the semantic prediction structure from the second neural network search space; and continue to jointly train a first branch and a second branch of the face detection network according to the network training loss function; the first branch including the feature extraction structure and the detection structure; the second branch including the feature extraction structure, the feature pyramid structure, the semantic prediction structure, and the detection structure; and when the face detection network is applied, an output of the second branch being an output of the face detection network.

In the foregoing face detection apparatus, after the target image is acquired, the face detection network is automatically invoked to process the target image. The feature extraction structure in the face detection network extracts the original feature maps from the target image. The feature enhancement structure of the face detection network processes the original feature maps to obtain the enhanced feature maps. The detection structure of the face detection network then obtains the face detection result of the target image based on the enhanced feature maps. There is more than one original feature map with different resolutions. In this way, original feature maps of multiple scales can include more abundant image information, which helps improve accuracy of subsequent face detection. In addition, the enhanced feature map obtained by processing the original feature map enhances feature differentiation and robustness, and further improves face detection accuracy. In addition, the feature enhancement structure is obtained by means of automatic searching, and a search space on which the search is based is determined together according to a detection objective of the face detection network and a processing object of the feature enhancement structure. On the one hand, great workload caused by an artificial design network structure is avoided, and performance is better than that of a manually designed network structure. On the other hand, the feature enhancement structure can be well applied to the face detection network, so that the face detection network can better perform face detection. In this way, detection accuracy is improved and labor costs are reduced.

For a specific limitation on the face detection apparatus, refer to the limitation on the face detection method above. Details are not described herein again. All or some of the modules in the foregoing face detection apparatus may be implemented by using software, hardware, and a combination thereof. The foregoing modules may be built in or independent of a processor of a computer device in a hardware form, or may be stored in a memory of the computer device in a software form, so that the processor invokes and performs an operation corresponding to each of the foregoing modules.

Figure 12:
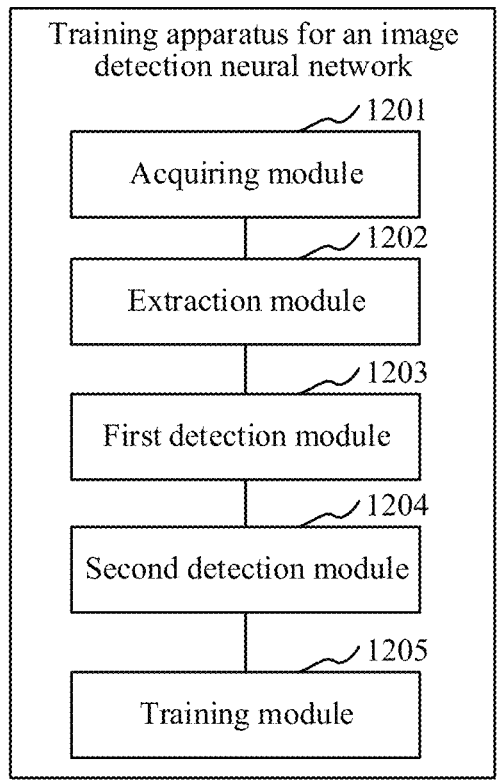
FIG. 12 is a structural block diagram of a training apparatus for an image detection neural network according to an embodiment.

In an embodiment, as shown in FIG. 12, a training apparatus for an image detection neural network is provided. The apparatus may use a software module or a hardware module, or a combination thereof so as to be a part of a computer device. The apparatus specifically includes an acquiring module 1201, an extraction module 1202, a first detection module 1203, a second detection module 1204, and a training module 1205.

The acquiring module 1201 is configured to acquire a training image and a face detection network; the face detection network including a feature extraction structure, a feature enhancement structure, and a detection structure; and the feature enhancement structure being obtained by searching a search space, and the search space used for searching the feature enhancement structure being determined based on a detection objective of the face detection network and a processing object of the feature enhancement structure; and the extraction module 1202 is configured to: input the training image into the face detection network, and extract original feature maps of the training image by using the feature extraction structure; the original feature maps having different resolutions;

the first detection module 1203 is configured to directly input the original feature maps into the detection structure to obtain a first detection result;

the second detection module 1204 is configured to: process the original feature maps by using the feature enhancement structure, to obtain an enhanced feature map corresponding to each original feature map, and input the enhanced feature map into the detection structure to obtain a second detection result; and the training module 1205 is configured to construct, according to the first detection result, the second detection result, and a training label, a training loss function to train the face detection network, until a training stop condition is met; when the face detection network is used for processing a target image, an output of a branch in which the feature enhancement structure is processed being an output of the face detection network.

In an embodiment, the feature enhancement structure includes a feature pyramid structure and a semantic prediction structure. The acquiring module 1201 is further configured to acquire a training image set; determine, according to the detection objective of the face detection network, a first neural network search space for searching the feature pyramid structure and a second neural network search space for searching the semantic prediction structure; search for the feature pyramid structure from the first neural network search space; and search for the semantic prediction structure from the second neural network search space. The second detection module 1204 is further configured to process the original feature maps by using the feature pyramid structure, to obtain a fused feature map corresponding to each original feature map; process the fused feature map by using the semantic prediction structure, to obtain an enhanced feature map corresponding to each original feature map; and input the enhanced feature map into the detection structure to obtain the second detection result.

In an embodiment, the first neural network search space includes more than one node; and a connection manner between the nodes includes a bottom-up connection, a top-down connection, and skip-connect. The acquiring module 1201 is further configured to: construct a search objective function, and search the first neural network search space to determine weights of candidate connection operations between the nodes based on the search objective function; and reserve, at the end of the search, a connection operation with a maximum weight between the nodes to obtain the feature pyramid structure.

In an embodiment, the second neural network search space includes more than one node and a directed edge connected to the more than one node, the node represents a unit for buffering data in the second neural network search space, and the edge represents that data buffered by a start node of the edge is inputted into an end node of the edge after connection operation processing. The acquiring module 1201 is further configured to construct a search objective function and simultaneously search for more than one substructure of the semantic prediction structure in the second neural network search space based on the search objective function; a quantity of sub-structures being the same as a quantity of fused feature maps; and reserve, at the end of the search, a connection operation with a maximum weight between nodes in each second neural network search space, to obtain the more than one sub-structure.

In an embodiment, the acquiring module 1201 is further configured to construct a search objective function; determine weights of candidate connection operations between the nodes in the second neural network search space according to the search objective function at each time of weight optimization in the search process; determine, at each time of network parameter optimization in the search process, a weight based on previous weight optimization, use a network structure obtained by reserving a connection operation with a maximum weight between nodes as a network structure for optimizing the network parameter, and optimize a network parameter of the network structure according to the search objective function; and overlap the weight optimization and the network parameter optimization until a search end condition is met.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In the foregoing training apparatus for an image detection neural network, the face detection network is a dual-branch structure, branching is performed after the feature extraction structure, the feature extraction structure is directly connected to the detection structure as a first branch, and the feature extraction structure is processed by using the feature enhancement model before being connected to the detection structure as a second branch. During training of the face detection network, the two branches cooperate in training, so as to assist in training the second branch by using the first branch, thereby improving training efficiency and effect. When the face detection network is used, the first branch is ignored and an output of only the second branch is used, and a network calculation amount is not increased. In addition, there is more than one original feature map with different resolutions. In this way, original feature maps of multiple scales can include more abundant image information, which helps improve accuracy of subsequent face detection. The enhanced feature map obtained by processing the original feature map enhances feature discrimination and robustness, and further improves face detection accuracy. In addition, the feature enhancement structure is obtained by means of automatic searching, and a search space on which the search is based is determined together according to a detection objective of the face detection network and a processing object of the feature enhancement structure. On the one hand, great workload caused by an artificial design network structure is avoided, and performance is better than that of a manually designed network structure. On the other hand, the feature enhancement structure can be well applied to the face detection network, so that the face detection network can better perform face detection. In this way, detection accuracy is improved and labor costs are reduced.

For a specific description of the training apparatus for the image detection neural network, refer to the foregoing description of the training method for the image detection neural network. Details are not described herein again. All or some of the modules in the training apparatus for the image detection neural network may be implemented by using software, hardware, and a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram of the computer device may be shown in FIG. 13. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, computer readable instructions, and a database. The internal memory provides an environment for running of the operating system and the computer readable instructions in the non-volatile storage medium. The database of the computer device is configured to store a neural network structure parameter. The network interface of the computer device is configured to communicate with an external terminal through a network connection. When the computer readable instructions are executed by the processor, a face detection method or a training method for an image detection neural network is implemented.

Figure 13:
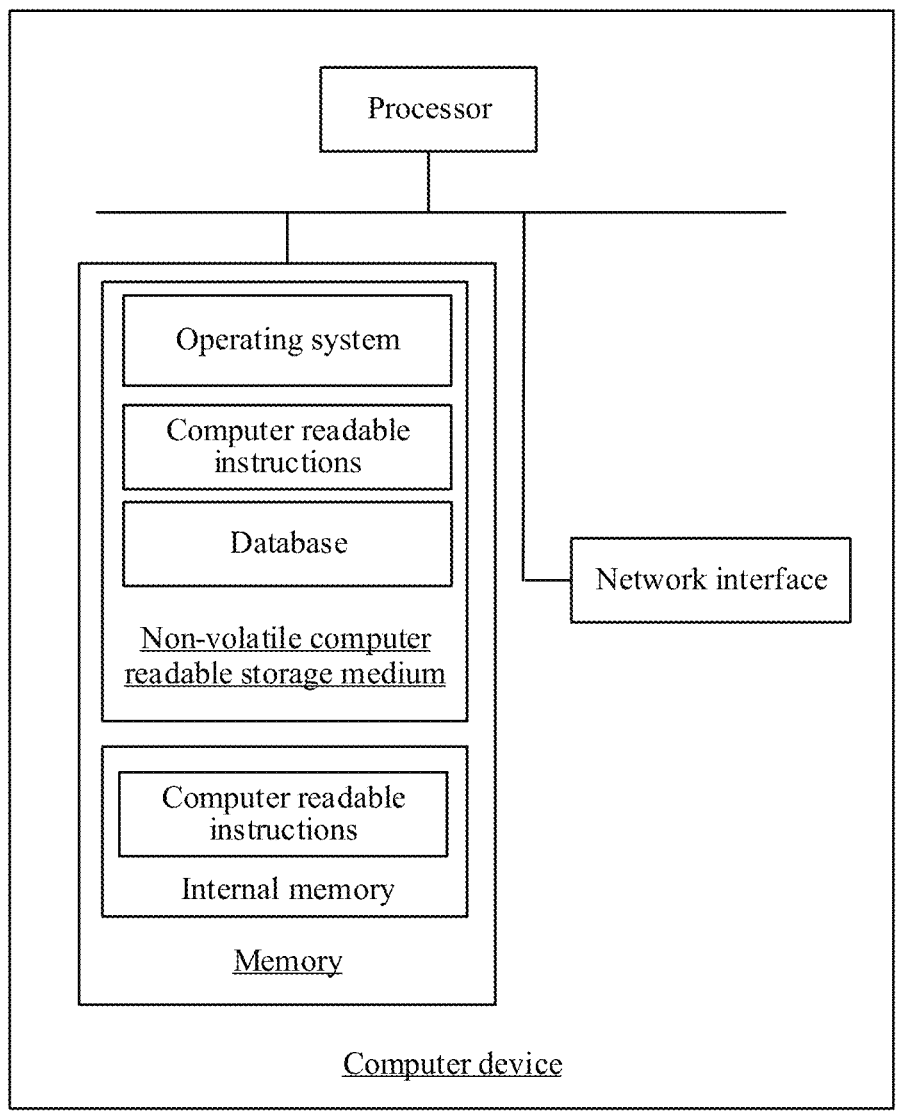
FIG. 13 is a diagram of an internal structure of a computer device according to an embodiment.

A person skilled in the art may understand that, the structure shown in FIG. 13 is only a block diagram of a part of a structure related to a solution of the present disclosure and does not limit the computer device to which the solution of the present disclosure is applied. Specifically, the computer device may include more or fewer members than those in the drawings, or include a combination of some members, or include different member layouts.

In an embodiment, a computer device is further provided, including a memory and one or more processors, where the memory stores computer readable instructions, and the one or more processors implement steps in the foregoing method embodiments when executing the computer readable instructions.

In an embodiment, one or more non-volatile computer readable storage media that store computer readable instructions are provided. When one or more processors execute the computer readable instructions, the steps in the foregoing method embodiments are implemented.

In an embodiment, a computer program product or a computer program is provided and includes computer readable instructions, the computer readable instructions are stored in a computer readable storage medium, a processor of a computer device reads the computer readable instructions from the computer readable storage medium, and a processor executes the computer readable instructions, so that the computer device performs the steps in the foregoing method embodiments.

A person of ordinary skill in the art may understand that all or some of the procedures of the methods of the foregoing embodiments may be implemented by computer readable instructions instructing relevant hardware. The computer readable instructions may be stored in a non-volatile computer-readable storage medium. When the computer readable instructions are executed, the procedures of the embodiments of the foregoing methods may be included. Any reference to a memory, a storage, a database, or another medium used in the embodiments provided in the present disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be combined in different manners to form other embodiments. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present disclosure, which are described specifically and in detail, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the present disclosure is subject to the protection scope of the appended claims.

What is claimed is:

1. A face detection method, performed by a computer device and comprising:
   acquiring a target image;
   invoking a face detection network, and processing the target image by using a feature extraction structure of the face detection network, to obtain original feature maps corresponding to the target image, the original feature maps having different resolutions;
   processing the original feature maps by using a feature enhancement structure of the face detection network, to obtain an enhanced feature map corresponding to each original feature map; the feature enhancement structure being obtained by searching a search space, and the search space used for searching the feature enhancement structure being determined based on a detection objective of the face detection network and a processing object of the feature enhancement structure; and
   processing the enhanced feature map by using a detection structure of the face detection network, to obtain a face detection result of the target image.

2. The method according to claim 1, wherein the feature enhancement structure comprises a feature pyramid structure and a semantic prediction structure; and processing the original feature maps comprises: fusing the original feature maps by using the feature pyramid structure; and enhancing, by using the semantic prediction structure, outputs of the feature pyramid structure.

3. The method according to claim 2, wherein a search space used for searching the feature pyramid structure and a search space used for searching the semantic prediction structure are respectively determined based on the detection objective of the face detection network and the processing object of the feature enhancement structure; the feature pyramid structure is configured to fuse the original feature maps to obtain a same quantity of the outputs; the semantic prediction structure comprises more than one sub-structure; and each of the sub-structures is configured to enhance one of the outputs of the feature pyramid structure.

4. The method according to claim 2, wherein the feature pyramid structure and the semantic prediction structure are respectively obtained by means of independent search based on different neural network search spaces; and
   processing the original feature maps comprises:
   fusing the original feature maps by using the feature pyramid structure, to obtain fused feature maps corresponding to the original feature maps; and
   performing semantic enhancement on the fused feature maps by using the semantic prediction structure, to obtain enhanced feature maps corresponding to the fused feature maps.

5. The method according to claim 4, wherein the fusing the original feature maps by using the feature pyramid structure, to obtain fused feature maps corresponding to the original feature maps comprises:

jointly inputting the original feature maps into the feature pyramid structure; and for an original feature map, fusing, in the feature pyramid structure, the original feature map, a feedforward feature map of the original feature map, and a feedback feature map of the original feature map to obtain a fused feature map of the original feature map;

the feedforward feature map of the original feature map being obtained according to a previous-layer original feature map of the original feature map, the feedback feature map of the original feature map being obtained according to a lower-layer original feature map of the original feature map, and a sequence of the original feature map following a sequence of a network layer at which the original feature map is extracted.

6. The method according to claim 2, wherein a search process of the feature pyramid structure comprises:

determining, according to the detection objective of the face detection network, a first neural network search space for searching the feature pyramid structure; the first neural network search space comprising more than one node; and a connection manner between the nodes comprising a bottom-up connection, a top-down connection, and skip-connect; and constructing a search objective function, and searching the first neural network search space to determine weights of candidate connection operations between the nodes based on the search objective function; and reserving, at the end of the search, a connection operation with a maximum weight between the nodes to obtain the feature pyramid structure.

7. The method according to claim 4, wherein the semantic prediction structure comprises a sub-structure corresponding to each fused feature map; and the performing semantic enhancement on the fused feature maps by using the semantic prediction structure, to obtain enhanced feature maps corresponding to the fused feature maps comprises:

inputting each fused feature map into a corresponding sub-structure; and processing, in each sub-structure, the fused feature map inputted into the sub-structure, to obtain an enhanced feature map corresponding to the fused feature map inputted into the sub-structure.

8. The method according to claim 7, wherein the sub-structure comprises more than one node and a directed edge connected to the more than one node, the node represents a unit for buffering data in the sub-structure, the edge represents that data buffered by a start node of the edge is inputted into an end node of the edge after connection operation processing, and the more than one node comprises an input node, an output node, and a leaf node between the input node and the output node; and the processing, in each sub-structure, the fused feature map inputted into the sub-structure, to obtain an enhanced feature map corresponding to the fused feature map inputted into the sub-structure comprises:

inputting, in each sub-structure, the fused feature map stored in the input node into the end node of each edge in the sub-structure after connection operation processing corresponding to the edge; and converging a leaf node that is also an end node to the output node, and outputting, by using the output node, an enhanced feature map obtained by means of fusion.

9. The method according to claim 2, wherein: the semantic prediction structure comprises a sub-structure corresponding to each fused feature map; and a search process of the semantic prediction structure comprises:

determining, according to the detection objective of the face detection network, a second neural network search space for searching the semantic prediction structure; the second neural network search space comprising more than one node and a directed edge connected to the more than one node, the node represents a unit for buffering data in the second neural network search space, and the edge represents that data buffered by a start node of the edge is inputted into an end node of the edge after connection operation processing;

constructing a search objective function and simultaneously searching for more than one sub-structure of the semantic prediction structure in the second neural network search space based on the search objective function; and reserving, at the end of the search, a connection operation with a maximum weight between nodes in each second neural network search space, to obtain the more than one sub-structure.

10. The method according to claim 9, wherein the constructing a search objective function and simultaneously searching for more than one sub-structure of the semantic prediction structure in the second neural network search space based on the search objective function comprises:

constructing a search objective function;

determining weights of candidate connection operations between the nodes in the second neural network search space according to the search objective function at each time of weight optimization in the search process;

determining, at each time of network parameter optimization in the search process, a weight based on previous weight optimization, using a network structure obtained by reserving a connection operation with a maximum weight between nodes as a network structure for optimizing the network parameter, and optimizing a network parameter of the network structure according to the search objective function; and overlapping the weight optimization and the network parameter optimization until a search end condition is met.

11. The method according to claim 2, wherein a training process of the face detection network comprises:

determining, according to the detection objective of the face detection network, a first neural network search space for searching the feature pyramid structure and a second neural network search space for searching the semantic prediction structure;

constructing a network training loss function;

separately searching for the feature pyramid structure from the first neural network search space according to the network training loss function, and searching for the semantic prediction structure from the second neural network search space; and continuing to jointly train a first branch and a second branch of the face detection network according to the network training loss function; the first branch comprising the feature extraction structure and the detection structure; the second branch comprising the feature extraction structure, the feature pyramid structure, the semantic prediction structure, and the detection structure; and when the face detection network is applied, an output of the second branch being an output of the face detection network.

12. A face detection apparatus, comprising: comprising a memory and one or more processors, the memory storing a computer program, and the computer program, when executed by the one or more processors, causing the one or more processors to implement:

acquiring a target image;

invoking a face detection network, and processing the target image by using a feature extraction structure of the face detection network, to obtain original feature maps corresponding to the target image, the original feature maps having different resolutions;

processing the original feature maps by using a feature enhancement structure of the face detection network, to obtain an enhanced feature map corresponding to each original feature map; the feature enhancement structure being obtained by searching a search space, and the search space used for searching the feature enhancement structure being determined based on a detection objective of the face detection network and a processing object of the feature enhancement structure; and processing the enhanced feature map by using a detection structure of the face detection network, to obtain a face detection result of the target image.

13. The apparatus according to claim 12, wherein the feature enhancement structure comprises a feature pyramid structure and a semantic prediction structure; and processing the original feature maps comprises: fusing the original feature maps by using the feature pyramid structure; and enhancing, by using the semantic prediction structure, outputs of the feature pyramid structure.

14. The apparatus according to claim 13, wherein a search space used for searching the feature pyramid structure and a search space used for searching the semantic prediction structure are respectively determined based on the detection objective of the face detection network and the processing object of the feature enhancement structure; the feature pyramid structure is configured to fuse the original feature maps to obtain a same quantity of the outputs; the semantic prediction structure comprises more than one sub-structure; and each of the sub-structures is configured to enhance one of the outputs of the feature pyramid structure.

15. The apparatus according to claim 13, wherein the feature pyramid structure and the semantic prediction structure are respectively obtained by means of independent search based on different neural network search spaces; and processing the original feature maps comprises:

fusing the original feature maps by using the feature pyramid structure, to obtain fused feature maps corresponding to the original feature maps; and performing semantic enhancement on the fused feature maps by using the semantic prediction structure, to obtain enhanced feature maps corresponding to the fused feature maps.

16. The apparatus according to claim 15, wherein the fusing the original feature maps by using the feature pyramid structure, to obtain fused feature maps corresponding to the original feature maps comprises:

jointly inputting the original feature maps into the feature pyramid structure; and for an original feature map, fusing, in the feature pyramid structure, the original feature map, a feedforward feature map of the original feature map, and a feedback feature map of the original feature map to obtain a fused feature map of the original feature map;

the feedforward feature map of the original feature map being obtained according to a previous-layer original feature map of the original feature map, the feedback feature map of the original feature map being obtained according to a lower-layer original feature map of the original feature map, and a sequence of the original feature map following a sequence of a network layer at which the original feature map is extracted.

17. The apparatus according to claim 13, wherein a search process of the feature pyramid structure comprises:

determining, according to the detection objective of the face detection network, a first neural network search space for searching the feature pyramid structure; the first neural network search space comprising more than one node; and a connection manner between the nodes comprising a bottom-up connection, a top-down connection, and skip-connect; and constructing a search objective function, and searching the first neural network search space to determine weights of candidate connection operations between the nodes based on the search objective function; and reserving, at the end of the search, a connection operation with a maximum weight between the nodes to obtain the feature pyramid structure.

18. The apparatus according to claim 15, wherein the semantic prediction structure comprises a sub-structure corresponding to each fused feature map; and the performing semantic enhancement on the fused feature maps by using the semantic prediction structure, to obtain enhanced feature maps corresponding to the fused feature maps comprises:

inputting each fused feature map into a corresponding sub-structure; and processing, in each sub-structure, the fused feature map inputted into the sub-structure, to obtain an enhanced feature map corresponding to the fused feature map inputted into the sub-structure.

19. The apparatus according to claim 18, wherein the sub-structure comprises more than one node and a directed edge connected to the more than one node, the node represents a unit for buffering data in the sub-structure, the edge represents that data buffered by a start node of the edge is inputted into an end node of the edge after connection operation processing, and the more than one node comprises an input node, an output node, and a leaf node between the input node and the output node; and the processing, in each sub-structure, the fused feature map inputted into the sub-structure, to obtain an enhanced feature map corresponding to the fused feature map inputted into the sub-structure comprises:

inputting, in each sub-structure, the fused feature map stored in the input node into the end node of each edge in the sub-structure after connection operation processing corresponding to the edge; and converging a leaf node that is also an end node to the output node, and outputting, by using the output node, an enhanced feature map obtained by means of fusion.

20. One or more non-transitory computer readable storage media that store computer readable instructions, when executed by one or more processors, causing the one or more processors to implement:

acquiring a target image;

invoking a face detection network, and processing the target image by using a feature extraction structure of the face detection network, to obtain original feature maps corresponding to the target image, the original feature maps having different resolutions;

processing the original feature maps by using a feature enhancement structure of the face detection network, to obtain an enhanced feature map corresponding to each original feature map; the feature enhancement structure being obtained by searching a search space, and the search space used for searching the feature enhancement structure being determined based on a detection objective of the face detection network and a processing object of the feature enhancement structure; and processing the enhanced feature map by using a detection structure of the face detection network, to obtain a face detection result of the target image.

* * * * *